US008613982B2

(12) United States Patent
Takahashi et al.

(10) Patent No.: US 8,613,982 B2
(45) Date of Patent: Dec. 24, 2013

(54) METHOD OF PRODUCING COATED LENSES

(75) Inventors: Naoto Takahashi, Shunan (JP); Katsuhiro Mori, Shunan (JP); Noriyuki Fukada, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 1043 days.

(21) Appl. No.: 12/516,740

(22) PCT Filed: Jan. 25, 2008

(86) PCT No.: PCT/JP2008/051085
§ 371 (c)(1),
(2), (4) Date: May 28, 2009

(87) PCT Pub. No.: WO2008/093613
PCT Pub. Date: Aug. 7, 2008

(65) Prior Publication Data
US 2010/0086700 A1 Apr. 8, 2010

(30) Foreign Application Priority Data
Feb. 2, 2007 (JP) ................................ 2007-024092

(51) Int. Cl.
*C08J 7/04* (2006.01)
*C08F 2/48* (2006.01)

(52) U.S. Cl.
USPC .......................................... 427/512; 427/508

(58) Field of Classification Search
None
See application file for complete search history.

(56) References Cited

U.S. PATENT DOCUMENTS

| | | | | |
|---|---|---|---|---|
| 5,234,556 | A * | 8/1993 | Oishi et al. | 204/157.51 |
| 5,633,049 | A * | 5/1997 | Bilkadi et al. | 427/487 |
| 5,914,174 | A | 6/1999 | Gupta et al. | |
| 5,984,539 | A | 11/1999 | Patton et al. | |

(Continued)

FOREIGN PATENT DOCUMENTS

| | | | |
|---|---|---|---|
| CN | 1224857 | A | 8/1999 |
| EP | 1 609 538 | A1 | 12/2005 |

(Continued)

OTHER PUBLICATIONS

Chinese Office Action dated Jul. 19, 2011 for Application No. 200880002541.0.

(Continued)

*Primary Examiner* — Guinever Gregorio
(74) *Attorney, Agent, or Firm* — Birch, Stewart, Kolasch & Birch, LLP

(57) ABSTRACT

A method of coating without permitting the coating solution to flow onto the side surfaces or the back surfaces of the lenses in the operation for applying the coating solution onto the lenses. A lens 15 is spin-coated with the coating solution having a particular viscosity. A side edge portion 121 of a spatula 119 is brought into contact with an upper edge portion of a side surface 15*a* of the lens 15 before the coating solution fed onto the surface of the lens arrives at the peripheral edge portion of the lens. The side edge portion 121 of the spatula 119 is so arranged that the upper end side of the spatula is tilted toward the center side of the lens 15 at an angle of 5 to 35 degrees with the vertical line as a reference. The coating solution applied onto the lens 15 that is rotating adheres onto the spatula 119 but does not adhere onto the side surface of the lens 15.

5 Claims, 16 Drawing Sheets

(56) References Cited

U.S. PATENT DOCUMENTS

| | | | | |
|---|---|---|---|---|
| 6,170,186 | B1 * | 1/2001 | Reed | 42/70.11 |
| 6,242,504 | B1 * | 6/2001 | Meyer-Roscher et al. | 522/2 |
| 6,468,596 | B1 * | 10/2002 | Liu et al. | 427/508 |
| 6,613,396 | B1 * | 9/2003 | Nishida et al. | 427/512 |
| 6,689,426 | B1 * | 2/2004 | Murahara et al. | 427/581 |
| 7,128,943 | B1 * | 10/2006 | Djeu | 427/162 |
| 8,409,670 | B2 * | 4/2013 | Mori et al. | 427/508 |
| 2004/0220292 | A1 | 11/2004 | Momoda et al. | |
| 2006/0269741 | A1 | 11/2006 | Izumi et al. | |
| 2007/0122626 | A1 * | 5/2007 | Qin et al. | 428/412 |
| 2008/0003356 | A1 * | 1/2008 | Samukawa et al. | 427/164 |
| 2009/0076189 | A1 | 3/2009 | Matsushige et al. | |
| 2010/0086700 | A1 * | 4/2010 | Takahashi et al. | 427/508 |
| 2010/0239776 | A1 * | 9/2010 | Yajima et al. | 427/488 |
| 2011/0151199 | A1 * | 6/2011 | Nelson et al. | 428/174 |
| 2012/0076947 | A1 * | 3/2012 | Ito et al. | 427/508 |

FOREIGN PATENT DOCUMENTS

| | | | |
|---|---|---|---|
| EP | 1 947 484 | A1 | 7/2008 |
| EP | 2 149 400 | A1 | 2/2010 |
| JP | 2005-13873 | A | 1/2005 |
| JP | 2005013873 | A * | 1/2005 |
| JP | 2005-246267 | A | 9/2005 |
| JP | 2005-246268 | A | 9/2005 |
| JP | 2005246267 | A * | 9/2005 |
| JP | 2005-343119 | A | 12/2005 |
| JP | 2006-45179 | A | 2/2006 |
| WO | WO-98/37115 | A1 | 8/1998 |
| WO | WO-00/36047 | A1 | 6/2000 |
| WO | WO-01/02449 | A2 | 1/2001 |
| WO | WO-03/011967 | A1 | 2/2003 |
| WO | WO-2004/078476 | A1 | 9/2004 |
| WO | WO 2007/052815 | A1 | 5/2007 |
| WO | WO 2007/139207 | A1 | 12/2007 |

OTHER PUBLICATIONS

Chinese Office Action issued on Mar. 26, 2012 in corresponding Chinese patent application No. 200980130135.7.

Extended European Search Report issued on Sep. 4, 2012 in corresponding European patent application No. 08710586.2.

* cited by examiner

AS VIEWED IN A
DIRECTION OF ARROW A

A

B

A

B

C

METHOD OF PRODUCING COATED LENSES

TECHNICAL FIELD

This invention relates to a method of producing coated lenses forming, for example, a photochromic coating on the lenses of spectacles maintaining a high quality.

BACKGROUND ART

A material that changes color depending upon the light can be represented by a photochromic material. The photochromic material reversibly varies the structure depending upon the incidence of ultraviolet rays and has a property of exhibiting varying absorption spectrum. This is the property of a material in that if an isomer is irradiated with light of a particular wavelength, the single chemical material reversibly forms another isomer having a different absorption spectrum due to the action of light. The formed another isomer resumes the color of the initial isomer due to heat or light of another wavelength.

There have been proposed photochromic spectacles using lenses that have properties of the photochromic material. Outside of a house, the photochromic spectacles quickly develop a color being irradiated with light containing ultraviolet rays such as of sunlight and works as sunglasses. Inside of the house where no light is incident, the photochromic spectacles have its color faded and works as an ordinary transparent spectacles.

Lenses having photochromic properties have heretofore been produced by a method which lets the surfaces of the lenses without photochromic property soaked with a photochromic compound, a method of directly obtaining a photochromic lens by dissolving a photochromic compound in a monomer followed by polymerization, and a method of forming a layer having photochromic property on the surface of the lens by using a coating solution that contains a photochromic compound (coating method).

Among the above methods of producing lenses, the coating method comprises forming a coating on the surface of the lens by the spin coating by injecting, onto the surface of the lens, a coating solution from a nozzle of a container containing the photochromic coating solution while rotating the lens. An apparatus for continuously coating a plurality of lenses can be represented by, for example, a coating apparatus disclosed in a patent document 1 described below which is equipped with an auxiliary mechanism for spreading a coating solution on the lenses by using a flexible film.

In order to form a coating having a sufficient degree of photochromic properties by the coating method, a photochromic solution having a relatively high viscosity of, for example, 25 to 1000 centipoises (cP) at 25° C. must be uniformly applied maintaining a thickness of not less than 5 μm and, preferably, not less than 30 μm. Here, use of the above coating apparatus makes it possible to satisfy the above requirements by using the coating solution in small amounts.

There has further been proposed an apparatus for applying a photocurable coating solution onto the surfaces of the spectacle lenses and for photocuring the coating solution as taught in a patent document 2 though it is not a dedicated apparatus for applying the photochromic coating solution.

The coating solution-applying apparatus of the patent document 2 is provided with coating solution dripping means by which the surfaces to be coated of the spectacle lenses are arranged facing upward and the coating solution is dripped to coat the spectacle lenses. Further, the coating solution-applying apparatus is provided with a spatula mechanism which can be moved by a slide mechanism and with a holder 133 for holding a spatula 132. Referring to FIG. 15A, the spatula 132 intersects a horizontal line L that extends back and forth passing through the center O of a to-be-coated surface 131*a* and a given point P1 on the outer circumferential edge portion at a predetermined angle β. Therefore, the front end of the spatula 132 comes in contact with a point P2 which is separated away from the above given point P1 toward the rear side in the rotational direction by a distance Δ on the outer circumferential edge portion of the to-be-coated surface 131*a*. Referring to FIG. 15B, further, the spatula 132 is attached to the holder 133 so as to be tilted by a predetermined angle α in the axial direction of the spectacle lens 131 with respect to the vertical line. That is, the spatula 132 is arranged being tilted with respect to the horizontal line and the vertical line of the lens 131.

The spectacle lens 131 is provided on the side surface thereof with a pair of coating solution removing members 135 for smoothing the thickness of the coating solution adhered to the side surface 131*b* of the spectacle lens 131. The coating solution removing members 135 are made of a foamed resin (sponge) having excellent adsorbing property in a cylindrical shape, and are attached to the surfaces of the mounting plates of a pantagraph mechanism with their axes perpendicular thereto maintaining a predetermined gap in the back-and-forth direction, so as to be pushed with a predetermined force onto the side surface of the lens when extended.

In the coating solution-applying apparatus of the patent document 2 constituted as described above, coating solution dripping means 136 is, first, arranged on the outer circumferential surface side of the lens 131 as shown in FIG. 16A. To drip the coating solution, a nozzle 136*a* of the coating solution dripping means 136 is moved from the outer circumference toward the center of the spectacle lens 131 as shown in FIG. 16B and is driven and controlled so as to apply the coating solution onto the surface of the lens 131 in a spiral manner.

When the coating solution is applied onto the to-be-coated surface of the lens by the spin-coating method, the coating solution spreads over the whole to-be-coated surface due to the centrifugal force created by the rotation of the lens and partly scatters and drops. At the outer circumferential edge portion of the to-be-coated surface of the lens, further, the coating becomes thick and swells due to the surface tension. If the film is thick, wrinkles may occur when the coating is cured by being irradiated with ultraviolet rays in the step of curing which is the next step. Therefore, the spatula 132 is provided for smoothing the coating solution and for removing excess of the coating solution at the outer circumferential edge portion of the to-be-coated surface of the spectacle lens.

Further, if the front end of the spatula 132 remains contacted to the outer circumferential edge portion of the to-be-coated surface of the spectacle lens, the coating solution stays along the outer circumferential edge of the to-be-coated surface of the lens due to the rotation of the spectacle lens. According to the coating solution-applying apparatus of the patent document 2, therefore, after the coating solution is dripped, the spatula 132 is arranged at the upper edge on the side surface of the lens 131 being tilted in the horizontal direction and in the vertical direction, and the coating solution removing member 135 is arranged on the side surface of the lens 131 as shown in FIG. 16C. An excess of the coating solution can be removed by the spatula 132, and the coating solution can be smoothed. According to the patent document 2, further, the coating solution dripped on the side surface 131*b* of the lens 131 is thinly spread so as to form a uniform coating of a uniform thickness by pushing the coating solution removing member 135 onto the side surface 132*a* of the spectacle lens 131.

Patent document 1: JP-A-2005-13873

Patent document 2: JP-A-2005-246267

DISCLOSURE OF THE INVENTION

Problems to be Solved by the Invention

When the photochromic coating solution is to be applied by using the apparatus of the patent document 1, too, problems occur such as the coating becomes thick at the outer circumferential portion of the lens and the coating solution adheres having irregular thickness on the side surface of the lens. These problems can be alleviated to some extent by using the spatula and the coating solution removing member as employed by the apparatus of the patent document 2.

When a photochromic coating solution is used as the coating solution, however, it became obvious that the following problems arouse despite the mechanism taught in the patent document 2 is employed.

First, the photochromic coating solution has such a high viscosity that once it adheres on the side surface of the lens, the coating solution adhered on the side surface can no longer be absorbed or removed, or can no longer be drawn maintaining a uniform thickness by using the sponge material. Therefore, if the operation is continued with the coating solution stayed on the side surface of the lens, isotropy is lost through the annealing after the curing with UV due to the coating solution that is unevenly adhered to the side surface of the lens, and the lens often develops optical distortion. Besides, the diameter of the lens increases by the amount the coating solution has adhered on the side surface often causing an inconvenience of out of size with the dedicated jig in the steps of after-treatments such as the hard coating treatment and the anti-reflection (AR) coating treatment.

Second, a cured body of the photochromic coating solution develops a color upon the irradiation with light. Unlike the case of when a clear coating solution that develops no color is applied, therefore, the product lens exhibits defective appearance if the photochromic coating solution adheres onto the side surface of the lens.

Third, when the photochromic coating solution is applied, a primer solution is often applied prior to applying the photochromic coating solution in order to improve the closely adhering property between the lens material and the photochromic coating. In this case, however, the primer layer does not necessarily cover the whole side surface of the lens. Therefore, if the photochromic coating solution adheres on the side surface of the lens, the portion where no primer layer is present as the underlayer tends to be easily peeled off. Being triggered by this portion, the photochromic coating peels, and the photochromic coating formed on the surface of the lens often partly peels off, too.

Fourth, though dependent upon the kinds of the lenses, some lenses have side surfaces of a thickness of not larger than 5 mm. When such lenses are used, the photochromic coating solution easily adheres on the back surfaces, too, flowing through the side surfaces. Even by employing the mechanism disclosed in the patent document 2, therefore, the coating solution often flows onto the back surfaces prior to coming in contact with the coating solution removing member or often flows onto the back surfaces at the time of coming in contact with or after having come in contact with the coating solution removing member. The lenses can be classified into finished lenses of which both surfaces are finished to assume predetermined optical surfaces when being transferred from the mold in the step of production and semi-finished lenses of which the back surfaces are polished to assume optical surfaces through the polishing work. The above problems tend to occur when the thickness of the lens is small. If the coating solution adheres on the back surface and cures, the product becomes defective due to contamination.

To avoid the above problems, the side surface and the back surface of the lens must be polished by using a polishing device after cured with the UV, and the adhered coating solution (cured product) must be removed causing the steps of production to become cumbersome.

The present invention was accomplished in view of the above circumstances and has an object of providing a method of producing coated lenses without permitting the coating solution to flow onto the side surfaces and back surfaces of the lenses in the operation for applying the coating solution to the lenses.

Means for Solving the Problems

The present invention is based on an idea that in forming a photochromic coating by using a coating apparatus as disclosed in the above patent document 1, the photochromic coating solution can be effectively prevented from adhering on the side surface of the lens if a spatula is set in a tilted manner to the upper edge portion of the lens prior to spreading the photochromic coating solution, i.e., prior to feeding the photochromic coating solution to the lens surface, or simultaneously with the feed of the photochromic coating solution to the lens surface, or after the photochromic coating solution is fed to the lens surface but before the coating solution arrives at the peripheral edge portion of the lens, and if an excess of the photocurable coating solution is removed by the spatula at the time when the photocurable coating solution is being spread. When the coating solution having a low viscosity is used, it is difficult to prevent the coating solution from adhering on the side surface of the lens even if the above method is employed. However, if the photochromic coating solution having a viscosity at 25° C. of 80 to 1000 centipoises is used, the excess of the coating solution can almost all be removed by the spatula that is set in a tilted manner to the upper edge portion of the lens making it possible to nearly completely prevent the photochromic coating solution from flowing onto the back surface of the lens or from adhering onto the side surface of the lens.

That is, the present invention is concerned with a method of producing coated lenses comprising the steps of:

(A) holding a lens with its surface facing upward by a spinning device that supports and rotates the lens;

(B) feeding a photocurable coating solution onto the upper surface of the lens held by the spinning device;

(C) spreading the photocurable coating solution fed onto the upper surface of the lens by using a flexible film while rotating the lens; and (D) forming a coating by curing the photocurable coating solution by irradiating the "lens coated with the photocurable coating solution that is spread thereon through the above step (C)" with light;

wherein the photocurable coating solution has a viscosity at 25° C. of 80 to 1000 centipoises (cP), and provision is further made of the step (E) of bringing the edge portion of a spatula into contact with the upper edge portion of the lens held by the spinning device, the upper portion of the spatula being tilted toward the center side of the lens, the step (E) being executed after the end of the step (A) but before the photocurable coating solution arrives at the circumferential edge portion of the lens in the step (C) to thereby remove an excess of the photocurable coating solution via the spatula at the time when the photocurable coating solution is being spread.

In the above method, it is desired that the upper portion of the spatula is tilted toward the center axis of the lens and that the flat surface of the spatula is arranged on a plane that passes through the center axis of the lens and a contact portion where the side edge portion of the spatula comes in contact with the upper edge portion of the lens.

According to the above method, further, it is desired to execute the step (E) after the step (A) but before starting the step (C). This makes it possible to reliably remove the excess of photocurable coating solution via the spatula. To produce the coated lens of a high quality having interference patterns spread in neat circles maintaining a high yield, further, it is desired to execute the step (E) after the step (A) but at a moment when the photocurable coating solution fed onto the upper surface of the lens is spread over 50 to 98% of the surface area of the lens in the above step (C).

It is further desired that the photocurable coating solution is a photochromic solution.

Effect of the Invention

In the method of coating the lenses of the present invention, use is made of the photocurable coating solution having a viscosity at 25° C. of 80 to 1000 centipoises, and the spatula is set to a predetermined position before the coating solution arrives at the circumferential edge portion of the lens in the step of spreading the coating solution to thereby remove the excess of photocurable coating solution without permitting it to adhere onto the side surface of the lens. As a result, the above-mentioned problems 1 to 4 do not occur even when the photochromic coating solution is being applied. According to the conventional method, the coating deposited on the side surface of the lens was wiped off or scratched off. The method of the present invention, however, obviates the need of the above laborious work.

According to the present invention, further, after the photocurable coating solution is spread over a particular range on the surface of the lens, the spatula is set to the predetermined position to produce the products of a high quality in good yields.

DESCRIPTION OF REFERENCE NUMERALS

Figure 1:
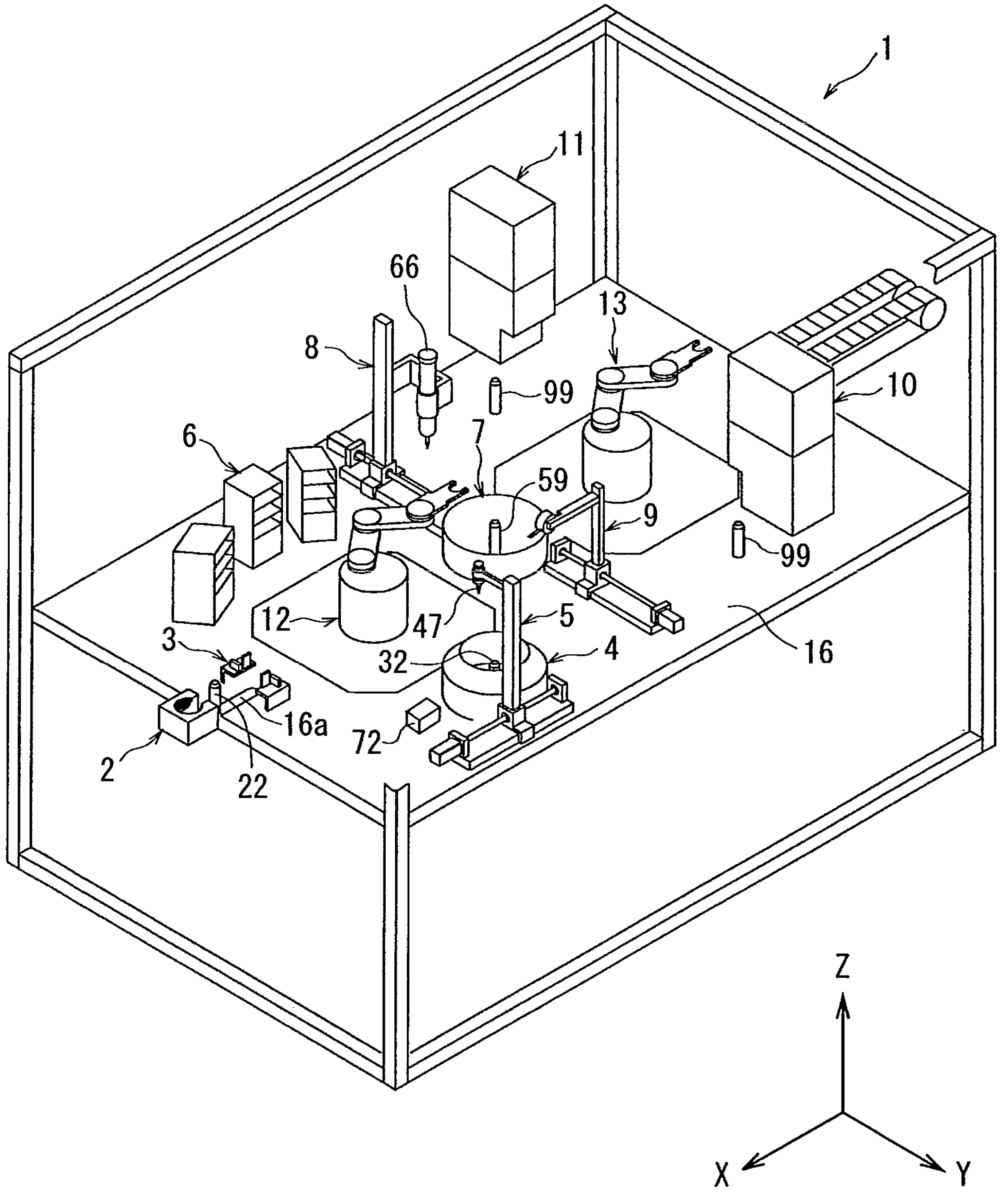
FIG. 1 is a perspective view illustrating a whole coating apparatus used for a method of producing coated lenses according to an embodiment of the invention.

1 coating apparatus
7 photochromic spinning device
8 photochromic solution-applying device
9 coating uniformalizing device
15 lens
48, 68 nozzles
66 container
86 film
111 jig for fixing spatula
119 spatula

BEST MODE FOR CARRYING OUT THE INVENTION

Embodiments of the invention will now be described with reference to the drawings as examples of using a preferred coating apparatus. In this specification, the X-axis direction of the coating apparatus is regarded to be the direction of width of the coating apparatus, the Y-axis direction is regarded to be the back-and-forth direction, and the Z-axis direction is regarded to be the up-and-down direction. Further, the coating apparatus of FIG. 1 includes not only those devices necessary for forming a photochromic coating but also the devices for forming a primer layer. In employing the method of the present invention, however, the above devices are not the essential ones. In forming the photochromic coating, further, the steps other than the steps (A) to (E) are arbitrary ones.

The coating apparatus 1 shown in FIG. 1 is for forming a coating on the lenses of spectacles and the like. The coating apparatus 1 includes, chiefly, a centering device 2 for determining the central position of the lens, a lens height measuring device 3 for measuring the height and gradient of the lens, a primer spinning device 4 for supporting and rotating the lens at the time of applying a primer coating, a primer solution-applying device 5 for applying a primer coating solution to the surface of the lens, a lens-drying device 6 for drying the coating solution applied to the lens, a photochromic spinning device 7 for supporting and rotating the lens at the time of applying a photochromic coating (corresponds to a spinning device in the step (A)), a photochromic solution-applying device 8 for applying a photochromic coating solution onto the surface of the lens, a coating uniformalizing device 9 for uniformalizing the thickness of the coating solution on the lens (corresponds to a flexible film in the step (C)), UV devices 10 and 11 for curing the coating solution, and a pair of handling devices 12 and 13 for conveying the lens.

As the lens 15, there can be suitably used a disk-like glass or resin base material that is usually used as a lens. From the standpoint of small weight and resistance against the cracking, however, it is desired to use a resin (plastic) lens. The plastic spectacle lenses, in general, have curved surfaces and, besides, their convex surfaces assume a complex curved shape as a result of modern development in the optical design. The present invention makes it possible to use the above spectacle lenses without any problem. If the thickness of the outer circumferential surface (side surface) of the lens is smaller than 5 mm, the conventional method was not capable of preventing the photochromic coating solution from adhering to the side surface and the back surface of the lens when it was applied. However, the method of the present invention makes it possible to prevent the photochromic coating solution from adhering to such portions. Owing to distinguished effect of the present invention as described above, it is desired to use the lens 15 having the side surface along the circumferential edge of the lens that is not larger than 5 mm and, particularly, not larger than 4 mm.

Further, the above lens, usually, has a curvature of 0 to 16 and an outer diameter of 55 to 80 mm.

Figure 2:
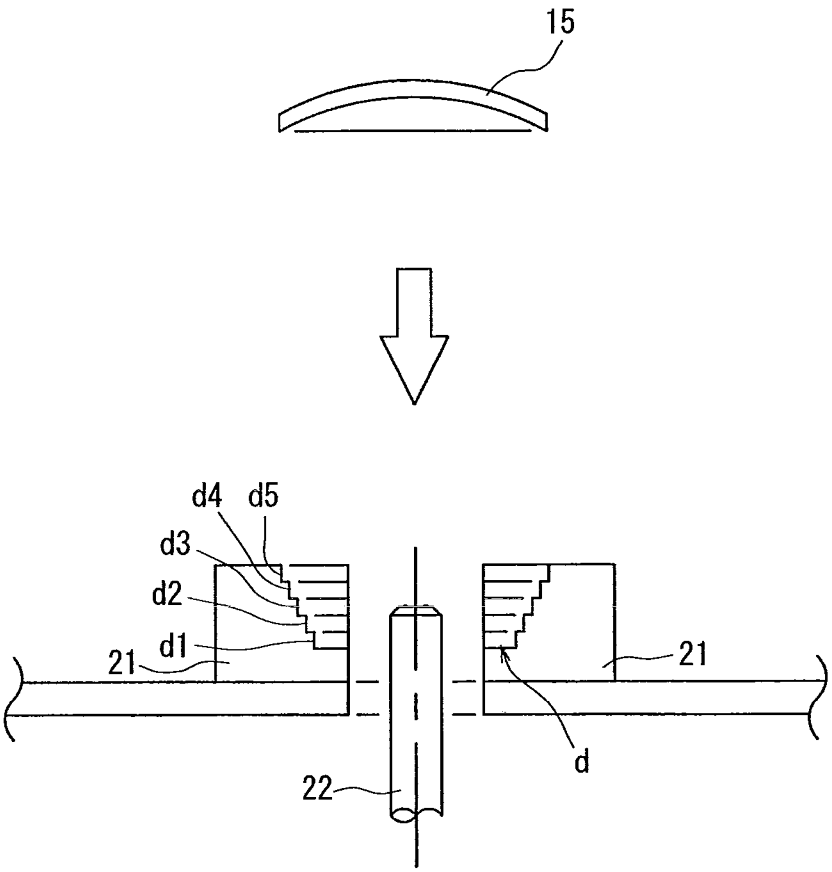
FIG. 2 is a sectional view of a centering device arranged in the coating apparatus of FIG. 1.

FIG. 2 illustrates a device 2 for centering the lens. The centering device 2 is arranged on the left side of a base plate 16 of the coating apparatus 1. The centering device 2 has a pair of block plates 21 which are provided maintaining a gap, each of the block plates 21 forming steps d arranged in concentric to center the lens 15. The steps d are formed to meet the outer circumferential shapes of the lenses 15 of various sizes, and are capable of centering the lenses of from a small diameter through up to a large diameter in order of the lowermost step d1 through d2, d3, d4 up to d5.

At the center of the steps d of the pair of block plates 21, a centering rod 22 is provided to support the lens of a circular shape in transverse cross section. The centering rod 22 is studded with its distal end facing upward in a manner that the central position of the centering rod 22 is in agreement with the centers of the steps d1 to d5. The centering rod 22 is so constituted that the lens 15 positioned being placed on the steps d can be supported at the distal end of the centering rod 22 by raising the centering rod 22.

The centering rod 22 can be moved up and down by a lift (not shown) provided on the side surface of the base plate 16, and can be moved in the transverse direction between the centering device 2 and the device 3 for measuring the height of the lens along a slit 16*a* formed in the base plate 16.

Figure 3:
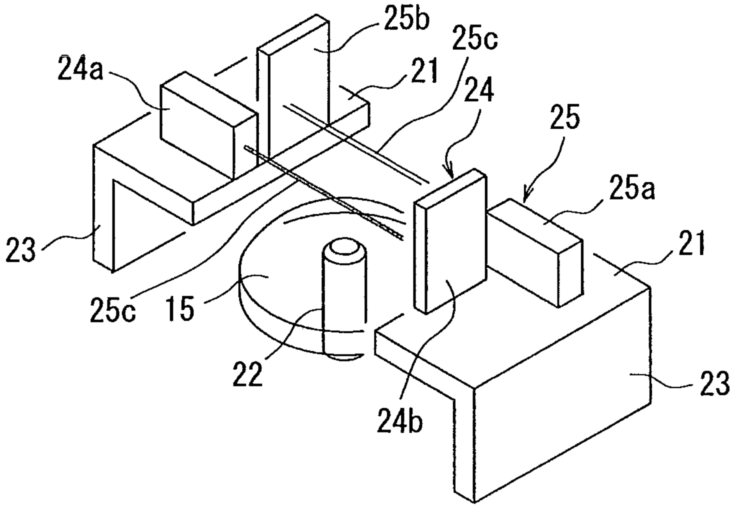
FIG. 3 is a perspective view illustrating a state where a lens is set to a sensor for measuring the height of the lens shown in FIG. 1.

FIG. 3 illustrates the sensor 3 for measuring the height of the lens.

The device 3 for measuring the height of the lens has a pair of support brackets 23 which are provided facing each other maintaining a gap. Two sets of sensor units 24 and 25 are arranged on the upper surfaces 21 of the support brackets 23. Sensors 24*a* and 25*a* of the sensor units 24 and 25 each have a light-emitting portion (light emitter) and a light-receiving portion (light receiver). The light-emitting portions emit laser beams which are reflected by mirrors 24*b* and 25*b*, and are received by the light-receiving portions of the sensors 24*a* and 25*a*.

The lens 15 conveyed from the centering device 2 by the centering rod 22 is arranged between the sensors 24*a*, 25*a* and the mirrors 24*b*, 25*b*. When the lens 15 is arranged between the sensors 24*a*, 25*a* and the mirrors 24*b*, 25*b*, the laser beams are refracted by the lens 15 and are, therefore, shut off. Therefore, the sensor units 24 and 25 detect the presence of the lens 15 and a reference height of the lens surface from the base plate 16.

Figure 4:
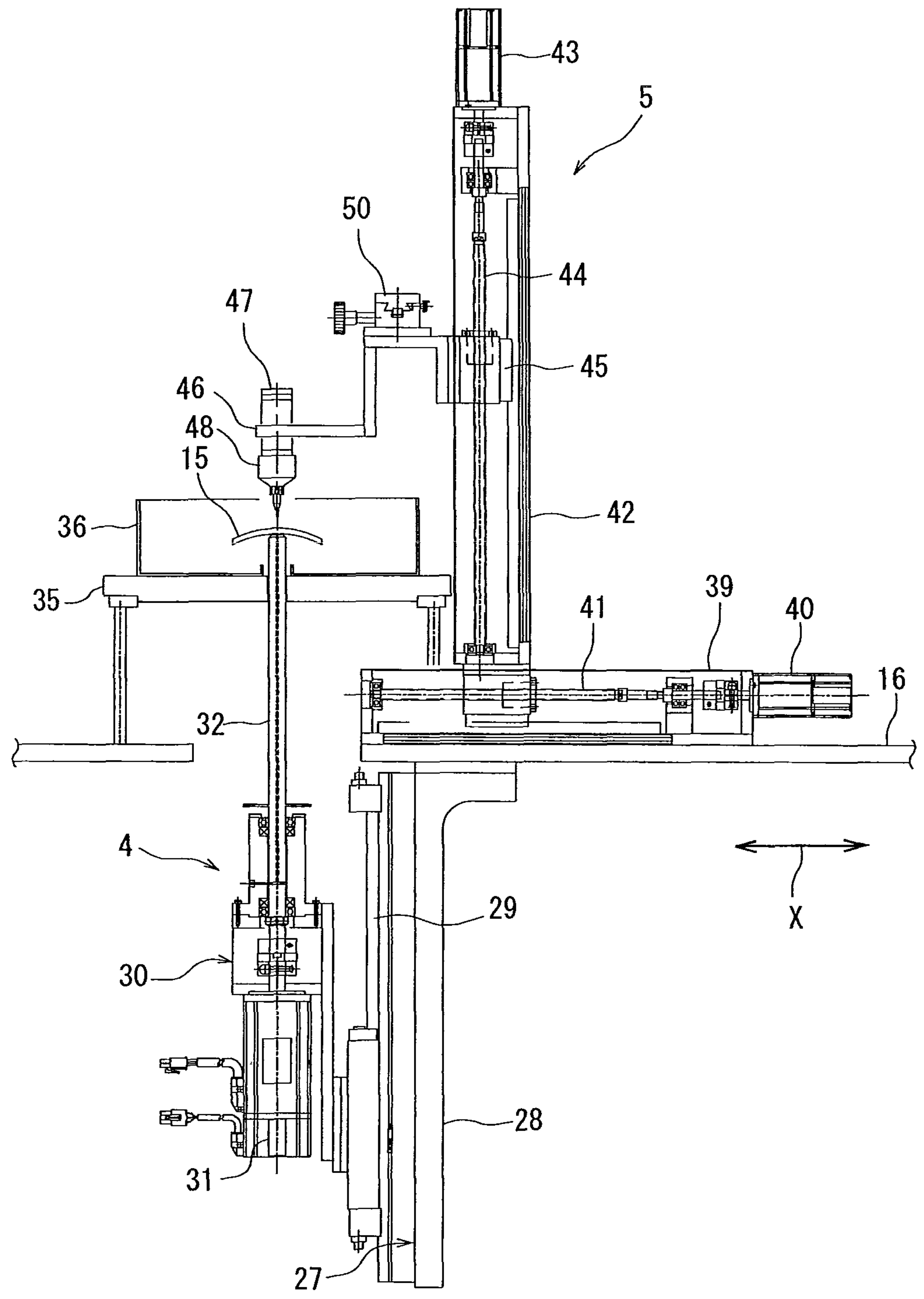
FIG. 4 is a sectional view illustrating a state where the lens supported by a spin shaft of a lens support device on the primer side of FIG. 1 is coated by using a primer-applying device.

FIG. 4 illustrates the primer spinning device 4 and the primer solution-applying device 5.

A lift unit 27 for the primer spinning device 4 is arranged in the base plate 16. The lift unit 27 is provided with a base plate-side support plate 28 fixed to the base plate 16, the base plate-side support plate 28 is provided with a guide rail 29 in the vertical direction, and a lift block 30 is fitted to the guide rail 29. The lift block 30 is capable of moving up and down along the guide rail 29 due to pneumatic pressure means based on a rodless cylinder that is not shown.

The lift block 30 is provided with a servo motor 31 which has a rotary shaft on the upper side thereof. The distal end of the rotary shaft is connected to a spin shaft 32 which is a lens support portion directed upward.

A seat 35 is arranged on the base plate 16 surrounding the spin shaft 32, and a coating solution recovery tray 36 is provided on the seat 35. The spin shaft 32 penetrates through the recovery tray 36 and the seat 35, and protrudes upward from the bottom surface of the recovery tray 36.

FIG. 4 illustrates the primer solution-applying apparatus 5.

As shown, an X-axis guide unit 39 is extending in the X-axis direction on the base plate 16. The X-axis guide unit 39 is screwed into an X-axis ball screw 41 connected to a servo motor 40. Further, a slide unit 42 is screwed into the X-axis ball screw 41. Upon driving the servo motor 40, the slide unit 42 can be moved forward or backward in the X-axis direction.

To the slide unit 42 is attached a Z-axis ball screw 44 that extends in the up-and-down direction being connected to the rotary shaft of the servomotor 43. A lift block 45 is mounted on the Z-axis ball screw 44 being screwed into the threaded portion thereof. Upon driving the servo motor 43, the lift block 45 moves up and down. A crank-shaped support member 46 is mounted on the lift block 45. A dispense valve 47 is mounted on the distal end of the support member 46, and a nozzle 48 for injecting the coating solution is arranged at the lower end of the dispense valve 47. An adjusting slider 50 is mounted on the support member 46 for adjusting the position of the nozzle 48 in the Y-axis direction. The central position of the nozzle 48 and the central position of the spin shaft 32 of the primer-side lens support device 4 are adjusted by the slide unit 42 and the slider 50.

Figure 5:
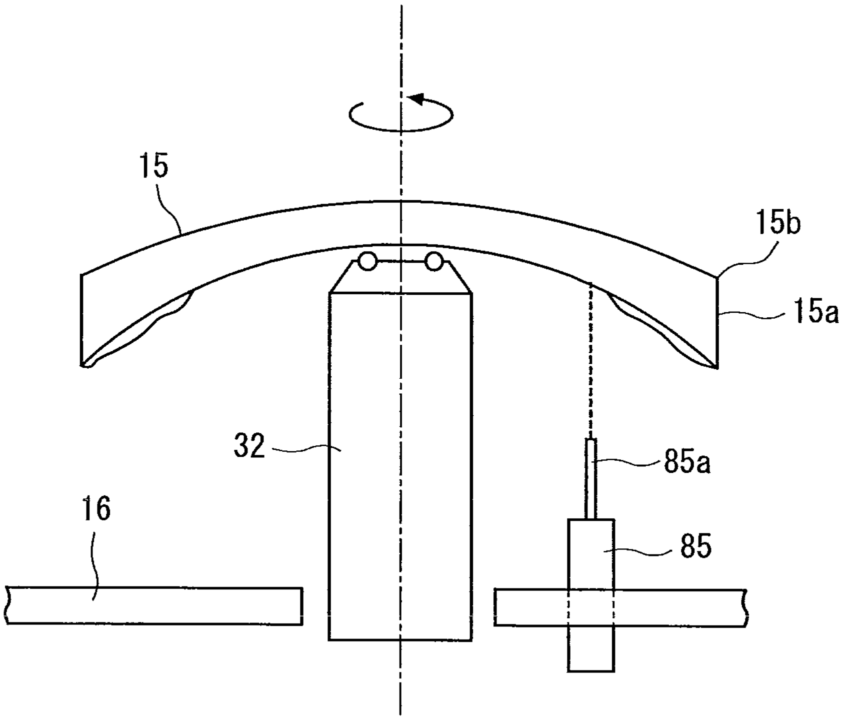
FIG. 5 is a sectional view of the vicinity of a nozzle for washing the primer coating solution.

FIG. 5 illustrates a nozzle 85 for washing the back surface of the lens 15. The nozzle 85 for washing the back surface is provided by the side of a spin shaft 32 and is arranged just under the lens 15 that is supported by the spin shaft 32. The nozzle 85 for washing the back surface is connected to a solvent feed source that is not shown, and arbitrarily injects the solvent upon opening or closing the nozzle shut-off means that is not shown. The nozzle 85 for washing the back surface protrudes upward from the base plate 16 through a hole formed in the base plate 16 whereby an injection nozzle 85*a* is directed in the vertical direction to inject the solvent to the back surface of the lens 15.

On the base plate 16 of the coating device 1 is provided a nozzle standby jar 72 in which the nozzle 48 of the dispense valve 47 will be dipped, and the solvent is stored in the nozzle standby jar 72.

Figure 6:
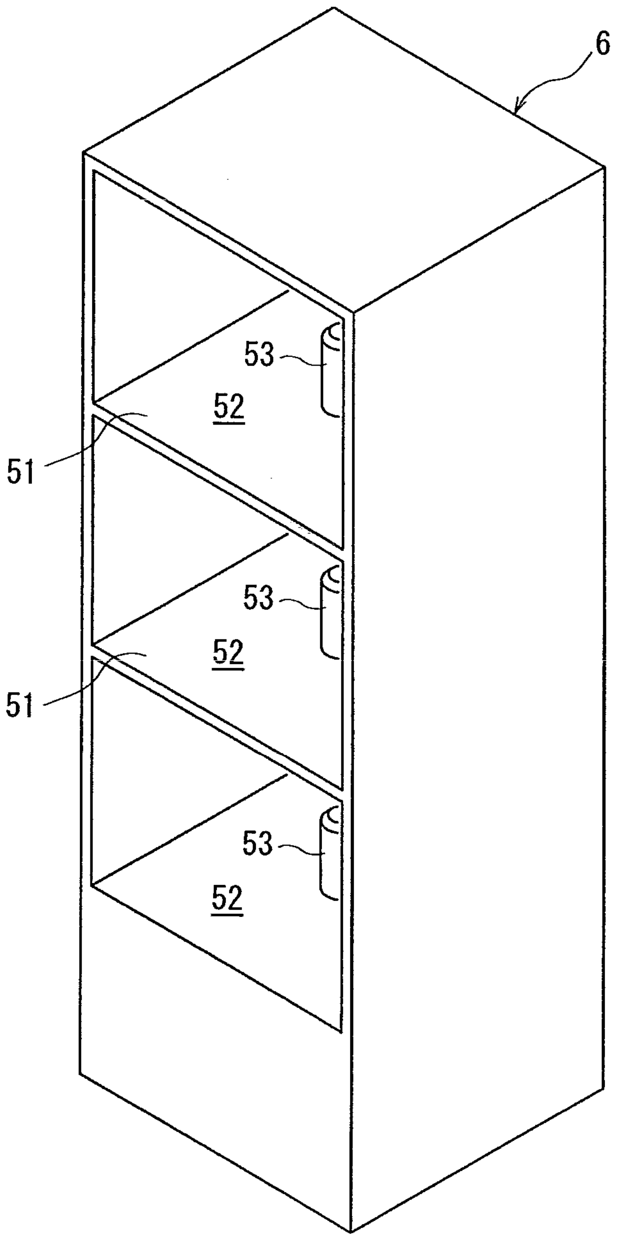
FIG. 6 is a perspective view of a lens-drying box provided in the coating apparatus.

FIG. 6 shows the lens-drying device 6.

The lens-drying device 6 in this embodiment comprises three boxes. Each lens-drying box is sectioned up and down by two partitioning plates 51 and, therefore, has three container chambers 52. Therefore, nine chambers are formed as a whole. Each container chamber 52 has an opening facing one handling device 12. A lens support shaft 53 is erected in the vertical direction at the bottom of each container chamber 52, and the lens 15 can be supported at the upper end of the lens support shaft 53.

Figure 7:
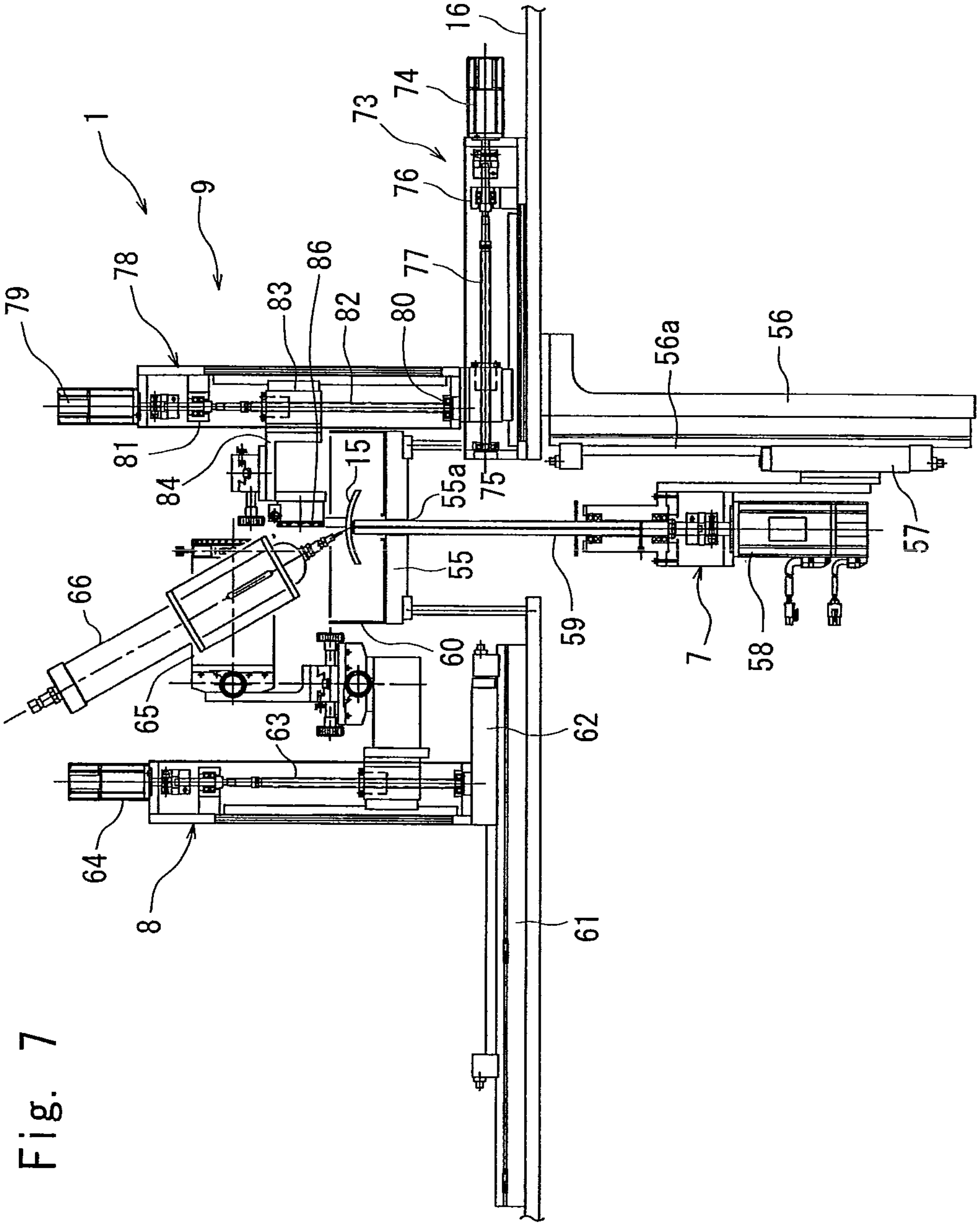
FIG. 7 is a sectional view illustrating a state where the lens supported by a spin shaft of a lens support device on the photochromic side of FIG. 1 is coated by using a photochromic solution-applying device.

FIG. 7 illustrates the photochromic spinning device 7, the photochromic solution-applying device 8 and the coating solution uniformalizing device 9.

The photochromic spinning device 7 is provided nearly at the central portion of the base plate 16 and is forming a circular seat 55 that protrudes upward from the base plate 16. A guide rail 56 is provided in the base plate 16. The guide rail 56 is provided with a lens support member 57 that slides on a rail 56*a* of the guide rail 56 in the up-and-down (vertical) direction due to the pneumatic force that is not shown. A servo motor 58 is fixed to the lens support member 57. An upwardly extending spin shaft 59 is attached to the servo motor 58, and is penetrating through a hole 55*a* formed in the circular seat 55 so as to work as a lens support portion. An adsorption hole is formed at the central portion of the spin shaft 59 and is connected to air suction means that is not shown so as to support the lens 15. A tray 60 for recovering the photochromatic coating solution is arranged surrounding the spin shaft 59.

Figure 8:
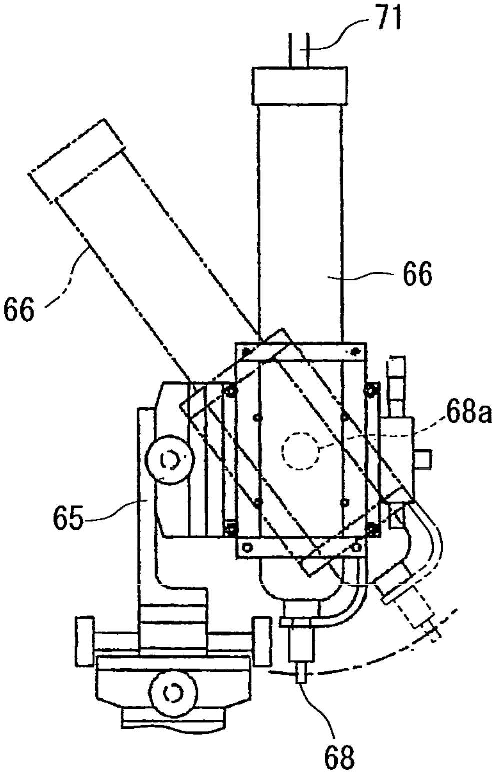
FIG. 8 is a view illustrating a portion of the photochromic solution-applying device on an enlarged scale.

As shown in FIG. 7, the photochromic solution-applying device 8 includes an air slide table 61 provided on the base plate 16, and a slide block 62 is fitted onto the air slide table 61 so as to slide in the back-and-forth (Y-axis) direction of the coating apparatus 1. A Z-axis ball screw 63 extending in the up-and-down direction is pivoted to the slide block 62, and a servo motor 64 is attached to an upper end of the Z-axis ball screw 63. The servo motor 64 is mounting a container support member 65 having a ball nut, and the container support member 65 is supporting a container 66 that contains the coating solution. Referring to FIG. 8, the container support member 65 is so mounted that the support angle thereof can be varied with respect to the container 66 with the rotary shaft 68*a* as an axis. As the slide block 62 slides on the air slide table 61 in the back-and-forth direction, the container 66 is allowed to move from just over the center of the lens 15 toward the outer side thereof in the radial direction.

Referring to FIG. 7, the coating solution uniformalizing device 9 includes a Y-axis slide unit 73 provided on the base plate 16. A Y-axis servo motor 74 is mounted on the Y-axis slide unit 73, and a Y-axis ball screw 77 supported by bearings 75 and 76 is attached to the Y-axis servo motor 74 so as to rotate. A Z-axis slide unit 78 having a ball nut is screwed into the Y-axis ball screw 77 and is allowed to move in the back-and-forth direction accompanying the rotation of the servo motor 74.

A servo motor 79 is mounted on the Z-axis slide unit 78, and a lift stage 83 equipped with a ball nut is attached to a Z-axis ball screw 82 that is supported by bearings 80 and 81, the ball nut being screwed onto the Z-axis ball screw 82. The lift stage 83 moves up and down as the servo motor 79 rotates. An arm 84 extending toward the spin shaft 59 is provided at an upper part of the lift stage 83, and a flexible film 86 comprising a plastic film such as a PET film is hanging down from the end of the arm 84 to uniformalize the thickness of the photochromic coating solution. If the Y-axis servo motor 74 is driven to move the lift stage 83 in the transverse direction, the film 86 passes through a locus on the center of the lens 15 in the radial direction.

Figure 9:
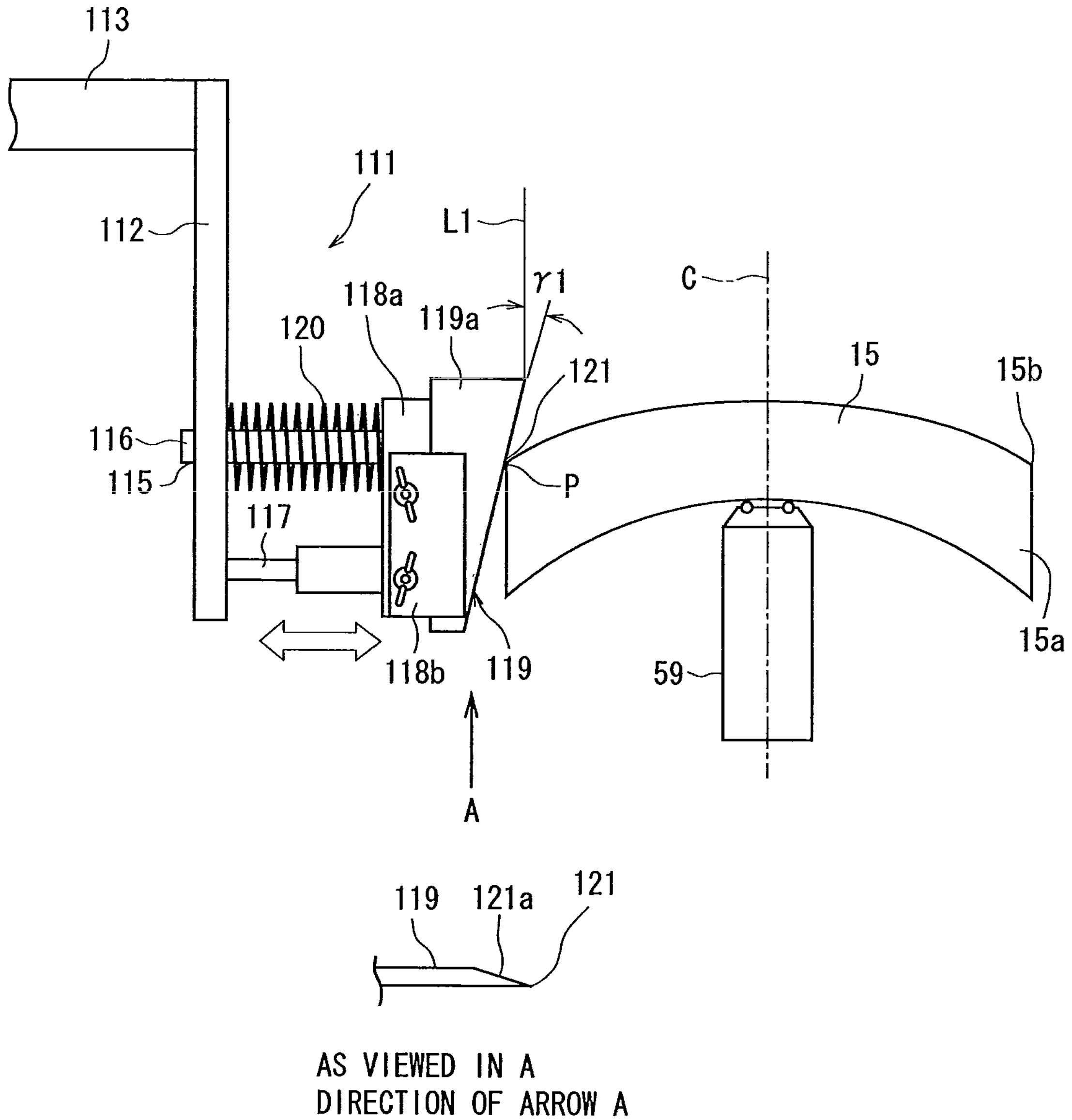
FIG. 9 is a side view illustrating, on an enlarged scale, the vicinity of a fixing jig for preventing the photochromic solution from adhering onto the side surface of the lens.

Referring to FIG. 9, near the spin shaft 59, a spatula-fixing jig 111 is provided on the upper surface (outer circumferential surface) 15*a* of the lens 15 to prevent the coating solution from adhering on the side surface of the lens 15. The spatula-fixing jig 111 is fixed to an arm 113 via a mounting plate 112. The arm 113 is mounted on moving means (not shown) that is fixed to the base plate 16 (FIG. 7) of the coating apparatus 1, and moves back and force facing the spin shaft 59. A slide rod 116 is provided on a lower portion of the mounting plate 112 to slide a hole 115 formed in the mounting plate 112 in the transverse direction. A fixing rod 117 is provided on a further lower portion of the mounting plate 112 nearly facing the outer circumferential surface of the lens 15. Distal ends of these rods 116 and 117 are forming grip portions 118*a* and 118*b* for gripping a spatula 119. The block-like grip portion 118*a* is attached to the distal ends of the rods 116 and 117, while the plate-like grip portion 118*b* is fixed to the side surface of the block-like grip portion 118*a* by screws so as to hold the spatula 119 therebetween.

The slide rod 116 has a spring 120 arranged between the mounting plate 112 and the grip portion 118*a*, so that the grip portion 118*a* slides on the fixing rod 117. The spatula 119 is so arranged that an upper end side of side edge portion (edge) 121 at where the spatula 119 comes in contact with the lens 15 is tilted toward the center side of the lens 15, and that the side edge portion 121 of the spatula 119 comes in contact with an upper edge portion 15*b* of the side surface 15*a* of the lens 15. If described in further detail, the upper side of the spatula 119 (upper side of the side edge portion 121 of the spatula 119) is tilted toward the center axis C of the lens 15, and a flat surface 119*a* of the spatula 119 is arranged on a plane that passes through the center axis C of the lens 15 and a contact portion P where the side edge portion 121 comes in contact with the upper edge portion of the lens 15.

Referring to FIG. 9, the end of the spatula 119 is forming a tilted surface 121*a* by chamfering the end that comes in contact with the lens 15, and is forming an edge. The spatula 119 can be made of a resin such as a polypropylene or Teflon (registered trademark) or a metal such as a stainless steel. Among them, when the lenses are to be continuously coated, it is desired that the spatula is made of a material harder than the material constituting the lenses and is made of, for example, a stainless steel.

Figure 10:
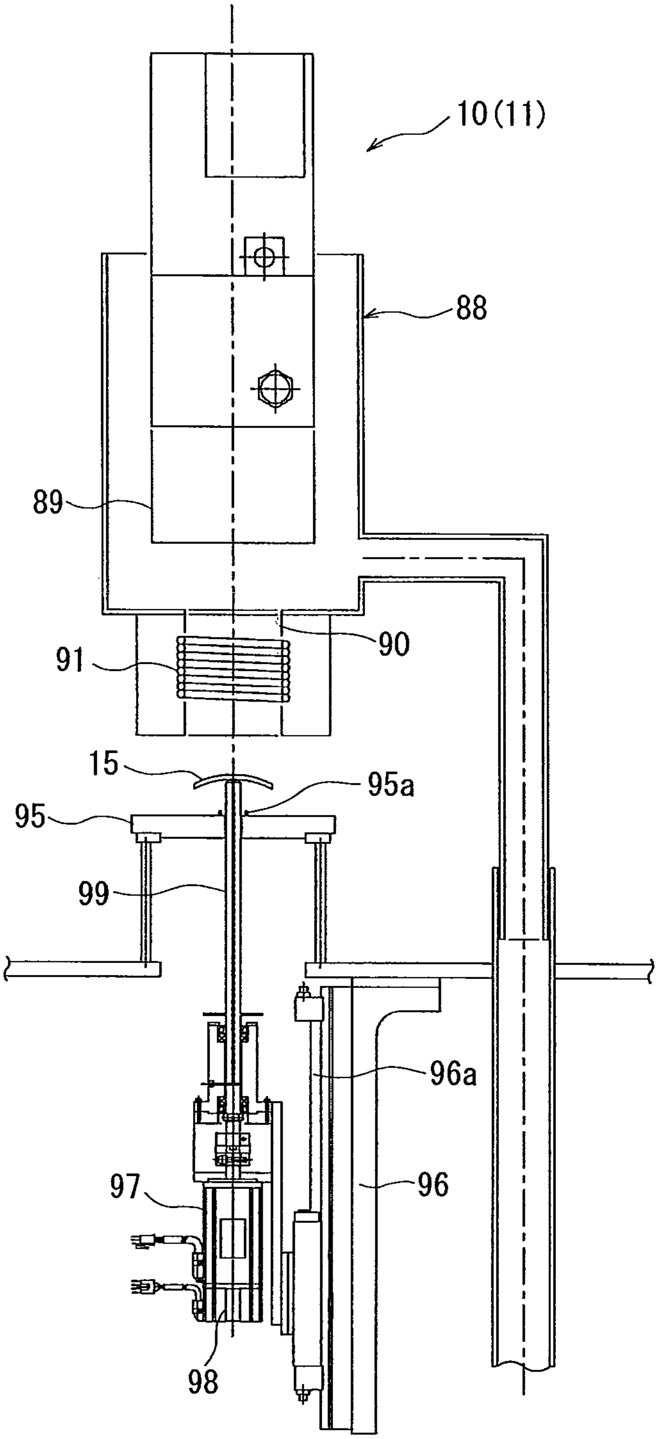
FIG. 10 is a sectional view of a UV device provided in the coating apparatus of FIG. 1.

FIG. 10 illustrates the UV devices 10 and 11 for curing the coating solution. The two UV devices 10 and 11 are the same ones, and only one UV device 10 will be described below.

The UV device 10 has a main block 88 that moves up and down due to lift means that is not shown. The main block 88 is provided with a UV lamp 89 arranged just over the lens 15.

A cylinder 90 made of a stainless steel is provided under the UV lamp 89 surrounding the lens 15. A cooling pipe 91 is arranged being wound like a coil surrounding the cylinder 90, and cooling water circulates through the cooling pipe 91. A gas feed port 92 is provided at an upper part of the cylinder 90 to introduce $N_2$ which is an invert gas into the cylinder 90. $N_2$ is discharged out of the cylinder 90 through a gas discharge port 93 provided at a lower part of the cylinder 90. A window 94 made of a borosilicate glass is formed at an upper part of the cylinder 90 enabling the UV light to pass through.

The UV devices 10 and 11 shown in FIG. 10 are provided on one side of the base plate 16 (on the right side in the drawing), and are forming a circular seat 95 protruding upward from the base plate 16. A guide rail 96 is provided in the base plate 16. The guide rail 96 is provided with a lens support member 97 that slides up and down on a rail 96*a* of the guide rail 96 due to the pneumatic force that is not shown. A servo motor 98 is fixed to the lens support member 97, and an upwardly extending spin shaft 99 is attached to the servo motor 98. The spin shaft 99 is penetrating through a hole 95*a* formed in the circular seat 95. As the servo motor 98 rotates, the lens 15 rotates at an arbitrary rotational speed via the spin shaft 99.

Figure 11:
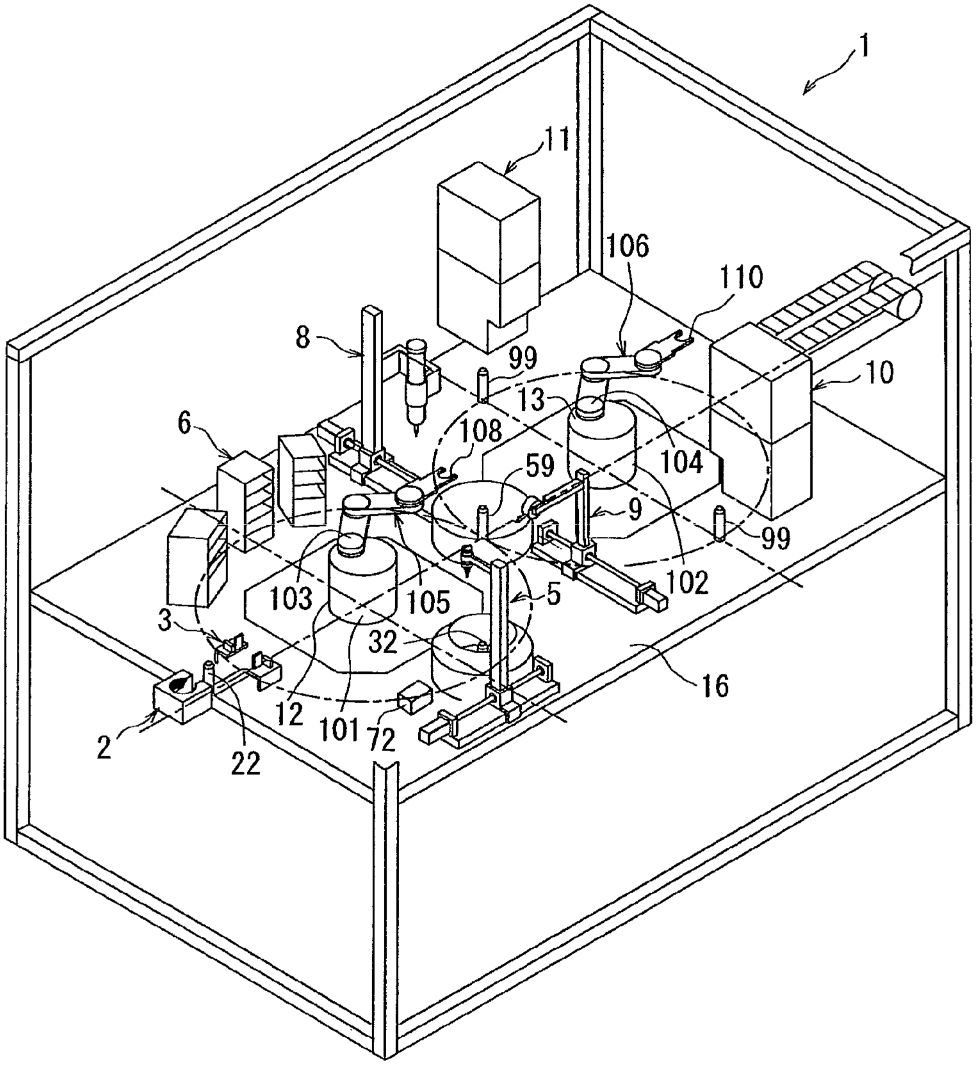
FIG. 11 is a perspective view corresponding to the coating apparatus of FIG. 1 and is a perspective view illustrating the motion of a handling device.

Referring to FIG. 11, the coating apparatus 1 is equipped with a pair of handling devices 12 and 13 for conveying the lens 15. The handling devices 12 and 13 have rotary shafts 103 and 104 provided on cylindrical bases 101 and 102 so as to move up and down. Arms 105 and 106 are attached to the rotary shafts 103 and 104 so as to rotate. The arms 105, 106 are multi-articulated mechanisms constituted by a plurality of arm members and rotary shafts, and are capable of expanding or contracting the locus of rotation in the radial direction. Hands 108 and 110 are connected to the ends of the arms 105 and 106 to hold the lens 15. The hand 108 of the one arm 105 turns on a locus which includes the centering rod 22 which is the lens support portion of the centering device 2 and of the lens height measuring device 3, spin shaft 32 of the primer spinning device 4, lens support shaft 53 of the lens-drying device and spin shaft 59 of the photochromic spinning device 7. The hand 110 of the other arm 106 turns on a locus which includes the spin shaft 59 of the photochromic device 7 and the spin shafts 99 of the UV devices 10 and 11.

Next, described below is the procedure of the photochromic coating operation according to the coating apparatus of this embodiment.

As the material of lens, for example, a thiourethane resin is used. As a pretreatment as shown in a flow diagram of FIG. 2, further, the lens 15 is washed with an alkaline aqueous solution or by an ultrasonic washing.

Next, the operation is carried out by using the coating apparatus, and the lens 15 is set to the centering device 2 shown in FIG. 2. The lens 15 is centered by being fitted to any one of the steps d1 to d5 depending upon the size of the outer diameter. The lens 15 is set manually or may be set by using a mechanical handling device.

After having been centered, the lens 15 is placed on the centering rod 22 that is disposed just under the center of the steps d of the centering device 2. The centering rod 22 conveys the lens 15 in the direction of width of the coating apparatus 1 up to the sensor 3 for measuring the height of the lens.

Figure 12:
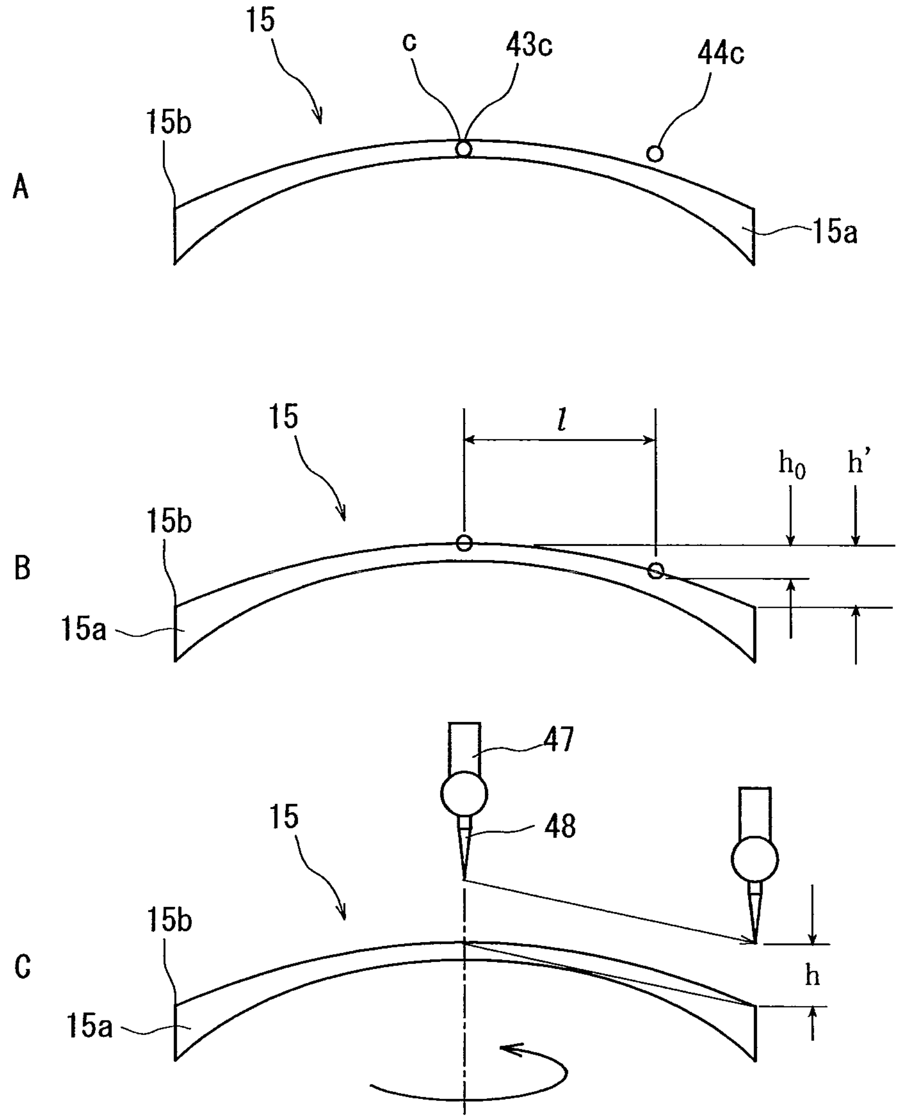
FIG. 12A is a sectional view of a state where the height of the lens is measured by the laser beam of the sensor for measuring the height of the lens shown in FIG. 3, B is a sectional view illustrating how to derive the position of the side surface of the lens, and C is a sectional view of a state where a primer coating is being applied onto the lens.

The lens height measuring device 3 detects the height of the lens 15 and a difference h' in the height from the center c on the front surface side of the lens 15 to the side surface 15*a* of the lens 15 shown in FIGS. 12A and 12B. The height of the lens 15 is found in order to bring the lens 15 into agreement with the height of nozzles 48 and 68 of the applying devices 5 and 8. The difference h' in the height of the lens 15 is detected in order to find the gradient of the lens 15 and to determine the condition for spinning the lens 15.

Referring to FIG. 3, while the laser beam of the sensor 24*a* is being shut off, a laser beam 25*c* from the light-emitting portion of the other sensor 25*a* is returning back to the sensor 24*b* via the mirror 25*b*, from which it is learned that no lens 15 is present. If the lens 15 is moved up, the laser beam 25*c* hits the lens 15 and is deflected. Therefore, the mirror 25*b* receives no laser beam 25*c* or receives deflected laser beam 25*c* which no longer returns back to the sensor 25*a*, and the presence of the lens 15 can be recognized. Thus, the center position (vertex) of the lens 15 and the difference h0 in the height at a given position other than the center of the lens 15 are detected.

The difference h' in the height from the center of the lens 15 to the side surface b thereof in the up-and-down direction can be derived by knowing the height at the center of the lens 15 and the difference $h_0$ in the height of the lens 15 detected by the other sensor unit 25. In practice, the difference h' in the height can be calculated by using an approximation such as $h'=h_0D^2/4L^2$.

The rotational speed of the lens 15 and the time for rotation in the next step are determined depending upon the gradient of the lens 15 derived from the difference h' in the height calculated according to the above formula and the radius R of curvature.

The lens 15 found for its curvature or gradient is held by the hand 108 of the handling device 12 and is placed on the spin shaft 32 of the primer spinning device 4. The lens 15 that is centered at the center of the end of the spin shaft 32 is then adsorbed.

Next, the lens 15 is subjected to the primer coating operation.

Referring to FIG. 12C, the primer coating operation is conducted by setting the nozzle 48 of the dispense valve 47 at the center of the lens 15, and driving the servo motor 31 of the lift block 30 to rotate the spin shaft 32. Thereafter, the nozzle 48 is moved straight from just over the center of the lens 15 up to the edge of the upper surface of the lens 15 in the radial direction of the lens maintaining a gap h of not larger than about 10 mm over the straight line from the center c of the lens 15 to the side surface b thereof in parallel with the straight line.

Due to the centrifugal force of the lens 15 that is rotating, the primer coating solution uniformly spreads over the whole surface of the lens 15. Here, the primer coating solution having a small viscosity may also flow onto the back surface through the side surface 15*a* of the lens 15. When being applied or spin-coated (or just after coated) with the coating solution, a solvent is injected to the back surface of the lens 15 from the injection nozzle 85*a* of the nozzle 85 for washing the back surface while the lens 15 is being rotated. The coating solution on the back surface of the lens 15 can thus be washed away by the injected solvent.

The primer coating solution used here is, desirably, an urethane-type primer resin from the standpoint of closely adhering property. The urethane-type primer resin has been disclosed in detail in WO2004/078476.

After the coating operation has finished, the end of the nozzle 48 is dipped in the solvent in the lens standby vessel 72 in order to prevent the nozzle 48 of the dispense valve 47 from drying.

After having been coated with the primer coating solution on the surface, the lens 15 is conveyed by the handling device 12 from the spin shaft 32 to the lens-drying device 6. After the coating solution on the lens 15 is solidified by the lens-drying device 6, the lens 15 is taken out of the lens-drying device 6. The operation up to this point is the primer coating operation, and the lens 15 that is dried is subjected to the photochromic coating operation in the next step.

Next, described below is the operation for coating the lens with the photochromic coating solution.

As the photochromic coating solution, there can be used a variety of photochromic coating solutions used in this field of art and among them, there can be used a photocurable composition containing a photochromic compound and having a viscosity at 25° C. of 80 to 1000 centipoises. If the photochromic coating solution having a viscosity at 25° C. of smaller than 80 is used, it becomes difficult to prevent the adhesion on the side surface of the lens. If the photochromic coating solution having a viscosity at 25° C. of larger than 1000 is used, on the other hand, the operability becomes poor and it becomes difficult to spread the photochromic coating solution maintaining a uniform thickness. From the standpoint of preventing the adhesion on the side surface of the lens and operability, therefore, it is desired to use the photochromic coating solution having a viscosity at 25° C. of 100 to 500 cP, preferably, 110 to 400 cP, particularly, 120 to 300 cP and, most preferably, 120 to 200 cP.

Preferred photochromic coating solutions are as exemplified in (i) to (vi) below having viscosities at 25° C. of 80 to 1000 centipoises.

(i) A photochromic coating agent obtained by dissolving a photochromic compound in an urethane oligomer (see WO98/37115).

(ii) A photochromic coating agent obtained by dissolving a photochromic compound in a polymerizable monomer composition of a combination of monofunctional, bifunctional and polyfunctional radically polymerizable monomers (see U.S. Pat. No. 5,914,174).

(iii) A photochromic coating agent obtained by dissolving a photochromic composition in a monomer composition of a combination of two or more kinds of bifunctional (meth) acrylic monomers only (see WO01/02449).

(iv) A photochromic coating agent comprising an N-alkoxymethyl(meth)acrylamide, a catalyst (preferably, an acid catalyst) and a photochromic compound (see WO00/36047).

(v) A photochromic coating agent comprising a radically polymerizable monomer containing a silanol group or a group that forms the solanol group upon the hydrolysis, an amine compound and a photochromic compound in particular amounts (leaflet of WO03/011967).

(vi) A photochromic coating agent comprising a radically polymerizable monomer component, a silicon-type or fluorine-type surfactant and a photochromic compound (see WO2004/078476).

Among them, the photochromic coating agent (vi) is preferred from the standpoint of closely adhering property to the above-mentioned urethane-type primer resin.

In the photochromic coating operation, the lens 15 on which the primer coating is solidified is conveyed by the handling device 12 from the lens-drying device 6 to the spin shaft 59 of the photochromic spinning device 7 (step (A)). An adsorption hole is perforated in the central portion of the spin shaft 59, and air suction means that is not shown is connected to the adsorption hole to adsorb the lens 15 to thereby support the lens 15. Therefore, the spin shaft 59 works as the lens support portion of the photochromic spinning device 7.

Figure 13:
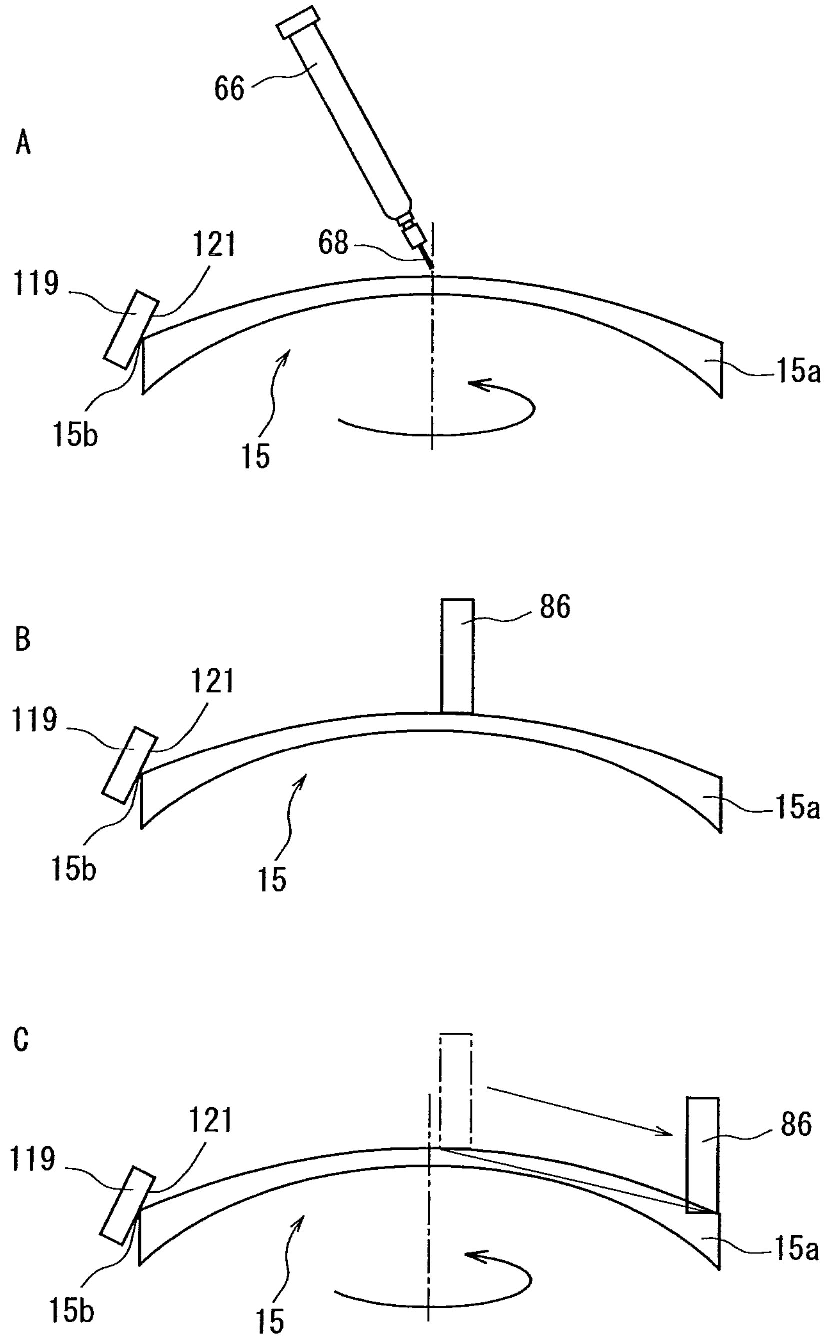
FIG. 13A is a sectional view of the lens in a state where the nozzle and the spatula of the photochromic-applying device shown in FIG. 7 are set to the lens, B is a sectional view of the lens in a state where the coating solution is applied onto the central portion of the lens, and C is a sectional view of the lens in a state where the film is moved toward the side surface of the lens.

In the photochromic coating operation as shown in FIG. 9 and FIG. 13A, the side edge portion 121 of the spatula 119 shown in FIG. 9 of the spatula-fixing jig 111 is brought into contact with the upper edge (corner) portion 15*b* of the lens 15 (step (E)). At this moment, the arm 113 is advanced toward the spin shaft 59 by moving means that is not shown to thereby automatically adjust the position of the spatula 119 depending upon the diameter of the lens that is to be coated. A particularly desired result is obtained if the side edge portion 121 of the spatula 119 is so arranged that the upper end thereof is tilted toward the center side of the lens 15 at an angle of 5 to 35 degrees with respect to the vertical line ($\gamma$1=5 to 35°).

The nozzle 68 of the container 66 is arranged just over the lens 15 as the slide block 62 moves on the air slide table 61 of the applying device 8 (see FIG. 7). The lens 15 is supported so as to rotate on the spin shaft 59, and the container 66 is supported in a tilted manner. Next, the photochromic coating solution is injected from the nozzle 68 onto the surface of the lens 15 with the spatula 119 being set to the upper edge portion of the side surface 15*a* of the lens 15 (step (B)).

In this embodiment as shown in FIG. 13B, the coating solution is injected onto the surface of the lens 15 with the end of the nozzle 68 being fixed to the central position of the lens 15 (position on the rotary axis of the lens 15 and about 1 mm over the surface of the lens 15).

Referring to FIGS. 13B and 13C, the coating solution injected onto the lens 15 is pushed and spread over the whole lens upon being contacted by the lower edge portion of the film 86 which is spread assist means (step (C)). The lens 15 is rotated and the film 86 is moved under the conditions in which the coating solution fed onto the central portion of the lens 15 can be most efficiently spread over the whole surface of the lens 15 by taking into consideration the gradient of the lens found by measuring the height of the lens.

As the lens 15 is rotated in a state where the film 86 conveyed by the coating uniformalizing device 9 onto the lens 15 is deflected on the lens 15, the coating solution is temporarily reserved as it is partly blocked by the film 86. The reserved coating solution is pushed and spread to assume a nearly uniform thickness due to the restoring force of the film 86. Upon maintaining this state, the film 86 is gradually moved from the center of the lens 15 to the side surface (upper edge portion) of the lens along a straight locus. Here, it is desired that the direction in which the film 86 moves is opposite to the direction in which the spatula comes in contact with the center of the lens material. It is further desired to rotate the lens 15 at, for example, 50 to 150 rpm while the coating solution is being spread by the film 86.

By utilizing the deflection of the film 86, it is made possible to spread the coating solution over the whole surface of the lens material and neatly (maintaining a nearly uniform thickness without irregular wetting) even without strictly controlling the position of the film 86 in the up-and-down direction depending on the curved surface of the lens. Further, since the coating solution can be spread so will not to develop irregular thickness, the coating solution can be utilized highly efficiently; i.e., the highly viscous solution can be applied in a small amount over the whole lens 15.

In this step, the amount of the photochromic coating solution on the lens 15 is larger than a desired thickness of the photochromic coating and, therefore, an excess of the coating solution on the lens 15 must be removed to attain a desired amount of the solution. To optimize the amount of the coating solution, the lens 15 is rotated to shake the coating solution off the lens 15. The rotational speed of the lens 15 is determined depending upon the conditions of the temperature in the apparatus and the gradient of the lens 15. It is desired that the lens 15 is rotated at, for example, 550 to 650 rpm which is faster than the rotational speed of when the coating solution is spread by using the film 86.

On the side lower than the upper edge portion 15*b* of the lens 15 at where the side edge portion 121 of the spatula 119 comes in contact with the lens 15, a gap is formed between the side edge portion 121 and the side surface 15*a* of the lens 15. Owing to the centrifugal force that is produced when the lens 15 is rotated, therefore, the coating solution does not drip on the side surface 15*a* of the lens 15 but is guided to the side of the spatula 119. Thus, the coating solution is prevented from adhering on the side surface 15*a* of the lens 15. As a result, the coating solution is prevented from dripping on the side surface 15*a* from the edge of the lens 15.

The spring 120 of the fixing jig 111 plays the roll of pushing the grip portion 118*a* supporting the spatula 119 toward the lens 15 maintaining a nearly constant force. The coating solution removed by the spatula 119 flowing along the spatula 119, remains stayed on the spatula 119 or drops on the tray 60 from the spatula 119 and is recovered.

Figure 14:
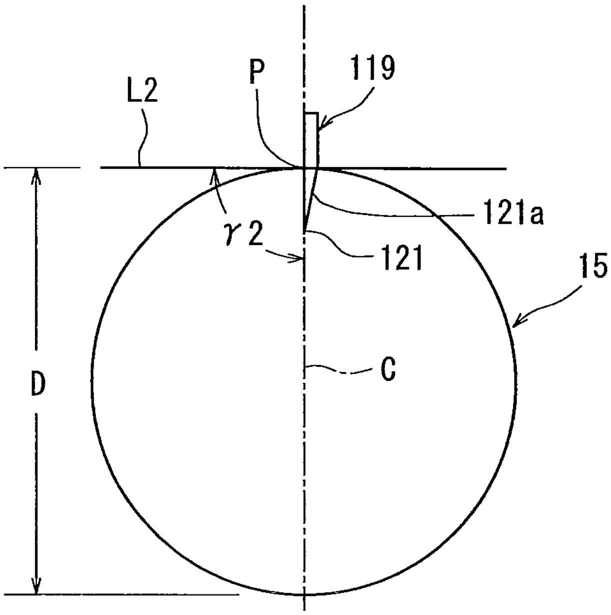
FIG. 14A is a plan view of the lens illustrating a tilting angle of the side edge portion of the spatula with respect to the direction of diameter of the lens, and B is a front view of the lens illustrating a tilting angle of the side edge portion of the spatula with respect to the vertical direction.
Figure 14:
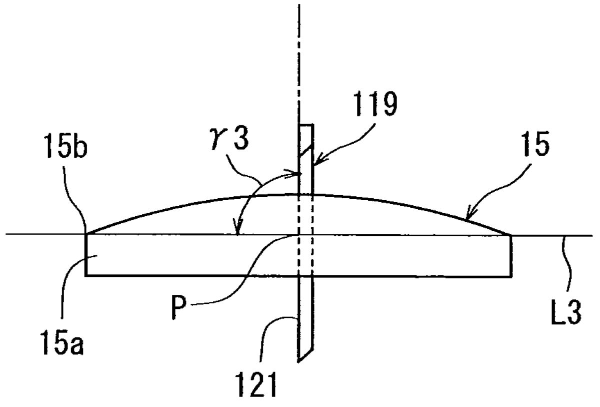
Figure 15:
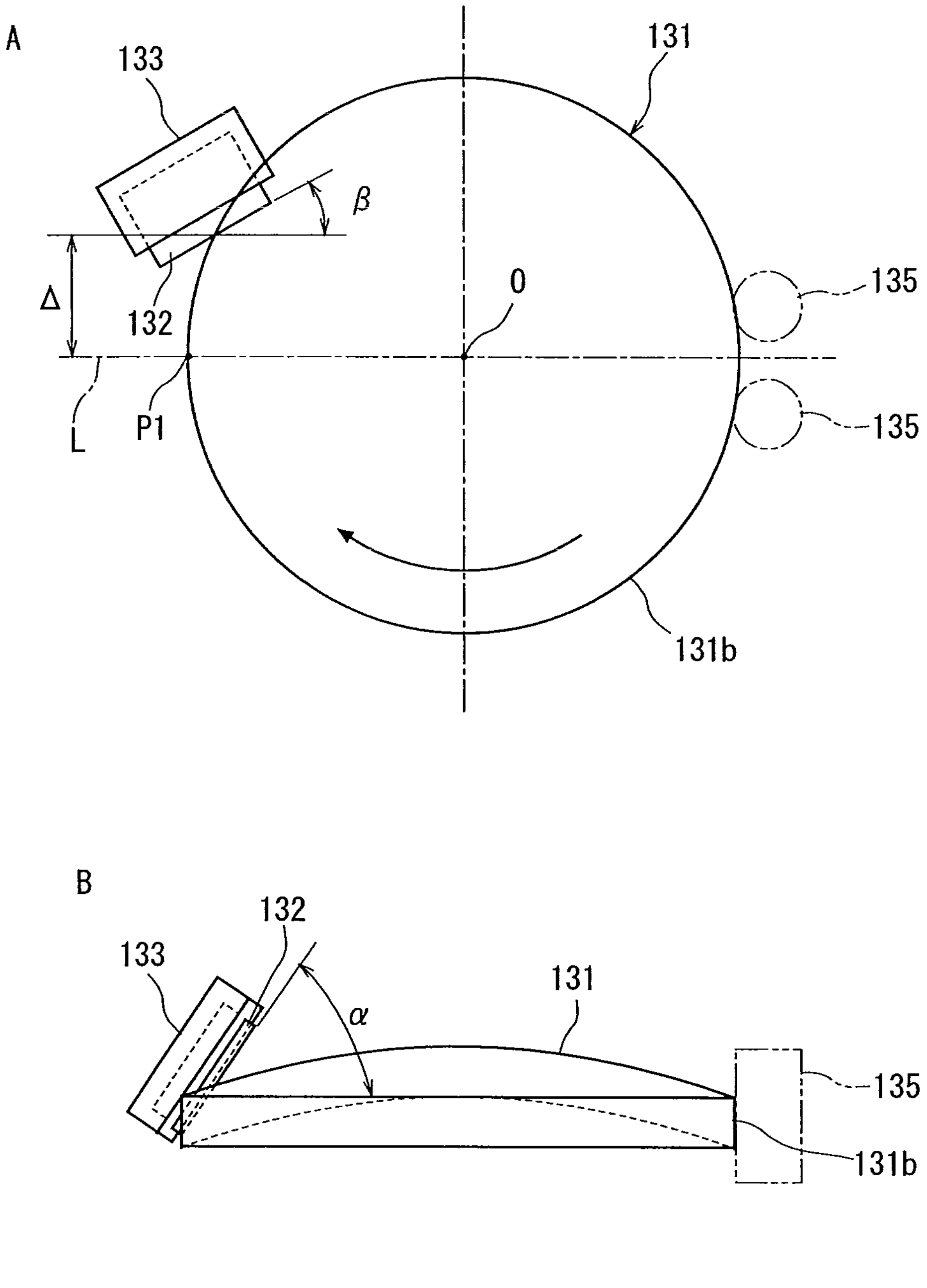
FIG. 15A is a plan view of the lens illustrating a method of spreading the coating solution on the lens by using a conventional coating solution-applying device, and B is a side view thereof.
Figure 16:
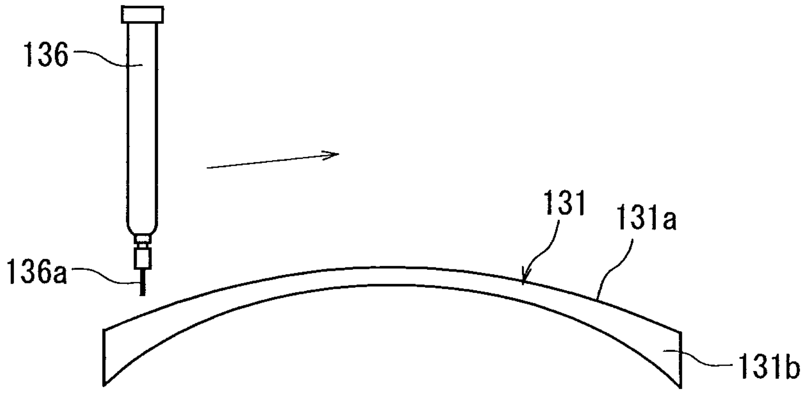
FIG. 16A is a sectional view of the lens in a state where a nozzle of a conventional coating solution-dripping means is set to the side edge portion of the lens, B is a sectional view of the lens in a state where the nozzle is moved to the central portion of the lens during the coating, and C is a sectional view of the lens in a state where the coating solution is applied, and the spatula and the coating solution-removing means are arranged at the circumference of the lens.
Figure 16:
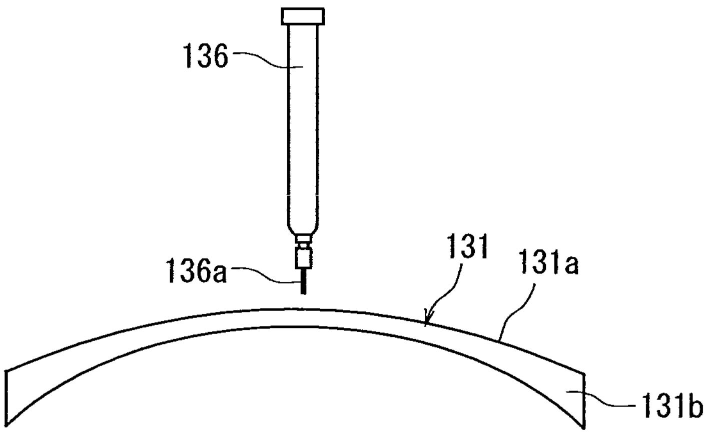
Figure 16:
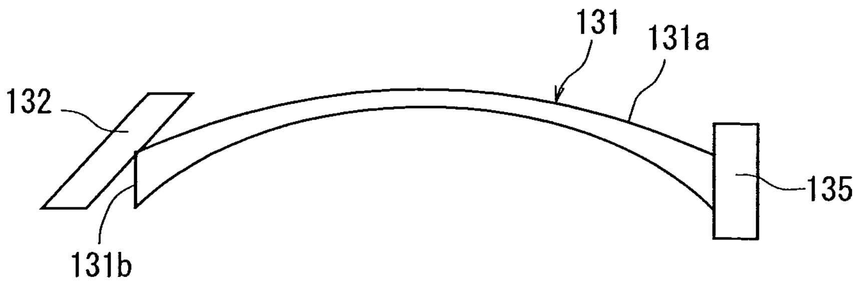

The reason is not yet clear why the coating solution does not adhere on the side surface of the lens 15. However, the coating solution having a small viscosity tends to adhere on the side surface of the lens whereas the coating solution having a large viscosity does not drip on the side surface of the lens. It is, therefore, considered that the viscosity of the coating solution is taking part in the cause of adhesion. In a state of viewing the lens 15 with the spatula 119 being positioned by the side of the lens as shown in FIG. 9 (side view of lens 15), further, a good result is obtained when a tilting angle $\gamma$1 of the side edge portion 121 of the spatula 119 with respect to the vertical line L1 is 3 to 45° and, particularly, 5 to 35° toward the rotary shaft (center) of the lens 15 at a contact point P where the lens 15 is in contact with the side edge portion 121 of the spatula 119 (corresponds to "90°−α" in FIG. 15). Referring to FIG. 14A which is a plan view of the lens 15, further, a good result is obtained if a tilting angle $\gamma$2 of the side edge portion 121 of the spatula 119 is set to be 90° with respect to the tangential line L2 of the lens 15 at a contact point P where the side edge portion 121 of the spatula 119 is in contact with the lens 15. Referring to FIG. 14B which is a front view of the lens 15 (the spatula 119 is on the rear side), a good result is obtained if a tilting angle $\gamma$3 of the side edge portion 121 is set to be 90° with respect to the horizontal line L3 that passes through the contact point P. Here, the flat surface 119*a* forming, on the side edge thereof, the side edge portion 121 of the spatula 119, is arranged on a flat plane that passes through the contact point P of the spatula 119 and the lens 15, and through the center axis C of the lens 15.

According to this embodiment as described above, the side edge portion 121 of the spatula 119 is brought into contact with the upper edge portion 15*b* of the lens 15 at the time of applying the coating solution making it possible to prevent the coating solution from adhering on the side surface 15*a* of the lens 15 and eliminating the need of wiping the photochromic coating solution off or the polishing. There is no need of washing the primer coating solution away from the back surface by using the nozzle 85 as shown in FIG. 5. There is no need of using the coating solution-removing member (see FIG. 14), either, that is arranged on the side surface of the lens as taught in the patent document 1.

The photochromic coating solution may also flow onto the back surface of the lens particularly when the curvature of the back surface of the lens is small. In this case, too, if the photochromic coating solution is applied with the spatula 119 being in contact, the coating solution is prevented from flowing not only onto the side surface of the lens 15 but also onto the back surface thereof. It is, therefore, made possible to prevent the back surface of the lens from being contaminated with the coating solution.

As described above, removal of the excess of the photochromic coating solution by using the spatula 119 is particularly advantageous in the case of producing finished lenses 15 without polishing the back surfaces thereof.

In the foregoing was described an embodiment in which the step (E) was executed after the end of the step (A) but prior to starting the step (B). The step (E), however, may be executed before the photochromic coating solution arrives at the circumferential edge portion of the lens in the step (C).

From the standpoint of further simplifying the control yet obtaining more reliable effect, it is desired that the step (E) has been finished by the start of the step (C). The coated lenses obtained through the above process are free of problems as products.

To produce the products of a high quality in good yields, on the other hand, it is desired that the step (E) is executed after the step (A) but at a moment when the photocurable coating solution fed onto the upper surface of the lens is spread up to, desirably, 50% to 98%, more desirably, 60 to 98%, further desirably, 70 to 98% and, particularly desirably, 90 to 98% of the surface area of the lens. This presumably decreases the effect of vibration given by the spatula to the coating solution that is being applied and makes it possible to more highly uniformly spread the photocurable coating solution. As a result, though the lenses after having been coated often exhibits interference patterns, it is allowed to produce the products of a high quality having interference patterns which are spread in neat circles in good yields.

The effect of the invention is exhibited most conspicuously when the photochromic coating solution having a predetermined viscosity is used. It is, however, also allowable to use a photocurable coating solution without containing the photochromic compound if its viscosity satisfies predetermined conditions.

After having been coated with the photochromic coating solution, the lens 15 is conveyed by another handling device 13 from the spin shaft 59 of the applying device 8 so as to be supported by the spin shaft 99 of the UV device 10 (or UV device 11). The spin shaft 59 is within the loci of both the one handling device 12 and another handling device 13.

Referring to FIG. 10, the lens 15 is surrounded by the cylinder 90 of the UV device 10, and the interior of the cylinder 90 is purged with nitrogen. After the height of the UV lamp 89 of the UV device 10 is adjusted to be in position, the lens 15 which is maintained rotating is irradiated with light from the UV lamp 89 to cure the coating.

After the photochromic coating operation has been finished, adhesion of the photochromic coating is checked to exclude defective products, and the acceptable products are subjected to the annealing. Thus, the photochromic coating is formed on the lens 15. That is, the coating solution of uniform thickness is applied making it possible to produce photochromic lens of a high quality.

This prevents the lens 15 from exhibiting defective appearance, from losing isotropy being caused by the coating solution unevenly adhered to the side surface of the lens, prevents the occurrence of such an inconvenience that the size does not fit to that of the dedicated jig in the subsequent step of forming a hard coating or anti-reflection coating and, further, prevents the coating from peeling caused by the primer layer that has unevenly adhered on the side surface of the lens.

The invention will now be described with reference to Examples and Comparative Examples to which only, however, the invention is in no way limited.

Example 1

A photochromic coating layer was formed on the surface of an allyl resin lens material 15 (CR; refractive index=1.50, thickness of side surface; 3.8 mm) according to the following procedure by using the coating apparatus shown in FIG. 1.

The lens 15 was, first, dewaxed with acetone to a sufficient degree. As a primer, a composition was obtained by mixing together a moisture curing primer manufactured by Takebayashi Kagaku Kogyo Co. “Takeseal PFR402TP-4” and ethyl acetate each in an amount of 50 parts by weight and, further adding 0.03 parts by weight of a leveling agent manufactured by Toray-Dow Corning Co. “FZ-2104” thereto followed by stirring to a sufficient degree in a nitrogen atmosphere until the composition became homogeneous. The CR surface was spin-coated with the primer composition and was cured at room temperature for 15 minutes to obtain a lens material having a primer coating.

Next, the lens 15 having the primer coating on the surface thereof was set to the photochromic spinning device 7 (step (A)). Next, the side edge portion 121 of spatula 119 of the fixing jig 111 was bought into contact with the upper edge portion 15*b* of the lens 15 (step (E), contact portion P: see FIG. 9). Here, the side edge portion 121 of spatula 119 was so arranged that the upper end portion thereof was tilted toward the center side of the lens 15 maintaining an angle of 30 degrees ($\gamma 1=30°$) with the vertical line (center axis in the C-direction: see FIG. 9) as a reference. As described earlier, the flat surface 119*a* of the spatula 119 was arranged on a plane that passed through the center axis C of the lens 15 and the contact portion P of the side edge portion 121 and the lens 15.

Thereafter, the nozzle 68 of the container 66 containing a separately prepared photochromic coating solution (having a viscosity at 25° C. of 130 cP) was arranged just over the lens 15, and 1 g of the photochromic coating solution was injected onto the surface of the lens 15 from the nozzle 68 (step (B)). Next, while rotating the lens material 15 at 100 rpm, the film 86 was brought into contact with the center of the lens 15 and was gradually moved up to the side surface (upper edge portion) of the lens along the straight locus to spread the photochromic coating solution. Next, the rotational speed was increased up to 600 rpm to remove an excess of the photochromic coating solution (step (C)). At this moment, the excess of the photochromic coating solution was guided by the spatula and was removed without adhering on the side surface 15*a* of the lens 15.

The lens 15 having the thus coated surface was conveyed by the handling device 13 from the applying device 8 to the UV device 10, was irradiated with light of a metal halide lamp of which the output has been adjusted to be 130 $mW/cm^2$ at 405 nm on the surface of the lens for 3 minutes in a nitrogen gas atmosphere to cure the coating, followed by the heat treatment in a constant-temperature vessel maintained at 120° C. to obtain a photochromic cured thin film (step (D)). The thus obtained photochromic cured thin film was measured for its thickness to be about 40 μm.

The thus produced lens material having the photochromic coating was observed by eyes to find that no cured body of the photochromic coating solution had been adhered on the side surface or the back surface of the lens.

The photochromic coating solution used in this Example was prepared in a manner as described below. That is, 2,2-bis (4-methacryloyloxypentaethoxyphenyl)propane/polyethylene glycol diacrylate (average molecular weight of 532)/trimethylolpropane trimethacrylate/polyesteroligomer hexaacrylate (EB-1830 manufactured by Dicel UCB Co.)/glycidyl methacrylate which are radically polymerizable monomers, were mixed together at a mixing ratio of 40 parts by weight/15 parts by weight/25 parts by weight/10 parts by weight/10 parts by weight, respectively.

Next, to 100 parts by weight of the thus obtained mixture of the radically polymerizable monomers were further added 2.0 parts by weight of a photochromic compound (PC1) having a structure represented by the following formula,

[Chemical formula 1]

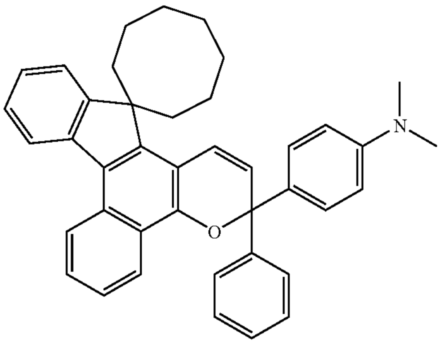

0.6 parts by weight of a photochromic compound (PC2) having a structure represented by the following formula,

[Chemical formula 2]

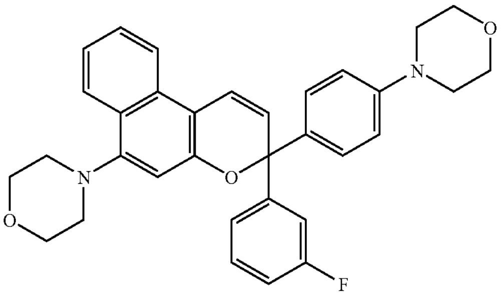

and 0.4 parts by weight of a photochromic compound (PC3) having a structure represented by the following structure,

[Chemical formula 3]

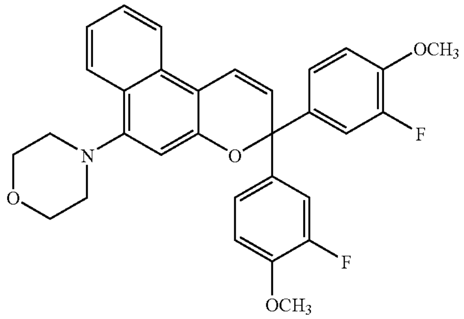

and were mixed together to a sufficient degree. Thereafter, 0.5 parts by weight of a polymerization initiator, i.e., CGI1800 {mixture of 1-hydroxycyclohexylphenyl ketone and bis(2,6-dimethoxybenzoyl)-2,4,4-trimethyl-pentylphosphinoxide (weight ratio of 3:1)}, 5 parts by weight of a stabilizer, i.e., bis(1,2,2,6,6-pentamethyl-4-piperidyl)sebacate, 7 parts by weight of a silane coupling agent, i.e., γ-methacryloyloxypropyltrimethoxysilane and 0.1 part by weight of a leveling agent manufactured by Toray-Dow Corning Co. (silicone surfactant "L-7001") were added thereto and were mixed to a sufficient degree to prepare the photochromic coating solution.

Comparative Example 1

A primer layer and a photochromic coating were formed in the same manner as in Example 1 but using a photochromic coating solution having a viscosity at 25° C. of 40 cP. The obtained lens material having the photochromic coating was observed by eyes to find that a cured product of the photochromic coating solution had been adhered on the side surface of the lens.

Comparative Example 2

A primer layer and a photochromic coating were formed in the same manner as in Example 1 but changing the timing for bringing the spatula into contact, bringing the spatula into contact after the coating solution has been spread, and increasing the rotational speed to remove an excess of the photochromic coating solution. The obtained lens material having the photochromic coating was observed by eyes to find that a cured product of the photochromic coating solution had been adhered on the side surface of the lens.

Example 2

A primer layer and a photochromic coating were formed in the same manner as in Example 1 but changing the ratio of mixing the radically polymerizable monomers and using a photochromic coating solution having a viscosity at 25° C. of 150 cP. The obtained lens material having the photochromic coating was observed by eyes to find that no cured product of the photochromic coating solution had been adhered on the side surface or the back surface of the lens.

Example 3

A primer layer and a photochromic coating were formed in the same manner as in Example 1 but changing the ratio of mixing the radically polymerizable monomers and using a photochromic coating solution having a viscosity at 25° C. of 195 cP. The obtained lens material having the photochromic coating was observed by eyes to find that no cured product of the photochromic coating solution had been adhered on the side surface or the back surface of the lens.

Example 4

A primer layer and a photochromic coating were formed in the same manner as in Example 1 but so arranging the side edge portion 121 of the spatula 119 that the upper end portion thereof was tilted toward the center side of the lens material 15 at an angle of 5 degrees (γ1=5°) with the vertical line as a reference. The obtained lens material having the photochromic coating was observed by eyes to find that no cured product of the photochromic coating solution had been adhered on the side surface or the back surface of the lens.

Example 5

Ten pieces of lenses having the photochromic coating were obtained in the same manner as that of Example 1 (also using the same photochromic coating solution as that of Example 1) but using allyl resin lenses 15 having an outer diameter of 75 mm (CR; refractive index=1.50, curvature of 5, thickness of side surface of 2 mm) and so arranging the side edge portion 121 of the spatula 119 that the upper end portion thereof was tilted at an angle of 5 degrees (γ1=5°) with the vertical line (center axis in the C-direction: see FIG. 9) as a reference.

The obtained lenses were observed by eyes to find that no cured product of the photochromic coating solution had been adhered on the side surfaces or the back surfaces of the 10 pieces of lenses. When the upper surfaces of the obtained lenses were observed by eyes, however, elliptic interference patterns were seen on 5 pieces of the lenses among the 10 pieces of them. However, all 10 pieces of lenses inclusive of the above lenses were without any problem.

Example 6

In Example 5, first, while the lens 15 was being rotated at 100 rpm, the film 86 was brought into contact with the center of the lens 15 and was gradually moved up to the side surface of the lens along the straight locus to spread the photochromic coating solution. Next, when the photochromic coating solution was spread up to 60% of the surface area of the lens 15, the side edge portion 121 of the spatula 119 was so arranged that the upper end portion thereof was tilted toward the center side of the lens material 15 at an angle of 5 degrees (γ1=5°) with the vertical line (center axis in the C-direction: see FIG. 9) as a reference. In other respects, the operation was carried out in the same manner as in Example 5 to obtain 10 pieces of lens materials having the photochromic coating.

The obtained lenses were observed by eyes to find that no cured product of the photochromic coating solution had been adhered on the side surfaces or the back surfaces of the 10 pieces of lenses. When the upper surfaces of the obtained lenses were observed by eyes, however, elliptic interference patterns were seen on 2 pieces of the lenses among the 10 pieces of them. However, all 10 pieces of lenses inclusive of the above lenses were without any problem.

Example 7

Ten pieces of lens materials having the photochromic coating were obtained in the same manner as in Example 6 but arranging the spatula at a moment when the photochromic coating solution was spread up to 95% of the surface area of the lens materials 15.

The obtained lens materials were observed by eyes to find that no cured product of the photochromic coating solution had been adhered on the side surfaces or the back surfaces of the 10 pieces of lenses. When the upper surfaces of the obtained lens materials were observed by eyes, however, all 10 pieces of lenses exhibited circular interference patterns manifesting they were of a high quality.

The invention claimed is:

1. A method of producing coated lenses comprising the steps of:

(A) holding a lens with its surface facing upward by a spinning device that supports and rotates the lens;

(B) feeding a photocurable coating solution onto an upper surface of the lens held by said spinning device;

(C) spreading the photocurable coating solution fed onto the upper surface of the lens by using a flexible film while rotating the lens; and (D) forming a coating by curing said photocurable coating solution by irradiating the "lens coated with the photocurable coating solution that is spread thereon through said step (C)" with light;

wherein said photocurable coating solution has a viscosity at 25° C. of 80 to 1000 centipoises (cP), and further comprising a step (E) of bringing an edge portion of a spatula into contact with an upper edge portion of the lens held by said spinning device, wherein the edge portion of the spatula is tilted at an angle of 5 to 35° relative to a vertical line toward the center of the lens, an upper portion of said spatula being tilted toward the center side of the lens, said step (E) being executed after the end of said step (A) but before the photocurable coating solution arrives at a circumferential edge portion of the lens in said step (C) to thereby guide an excess of the photocurable coating solution from the upper edge portion of the lens to a side of the spatula and consequently prevent the coating solution from dripping on a side surface of the lens at the time when the photocurable coating solution is being spread, wherein the lens set in said step (A) is a lens having a primer layer formed on the surface thereof by a spin-coating method.

2. The method as set forth in claim 1, wherein a flat surface of said spatula is arranged on a plane that passes through a center axis of the lens and a contact portion where a side edge portion of said spatula comes in contact with the upper edge portion of the lens.

3. The method as set forth in claim 1 or 2, wherein said step (E) is executed after said step (A) but before starting said step (C).

4. The method as set forth in claim 1 or 2, wherein said step (E) is executed after said step (A) but at a moment when the photocurable coating solution fed onto the upper surface of the lens is spread over 50 to 98% of a surface area of the lens in said step (C).

5. The method as set forth in claim 1, wherein said photocurable coating solution is a photochromic solution.

* * * * *